(12) United States Patent
Kimura et al.

(10) Patent No.: US 11,908,990 B2
(45) Date of Patent: Feb. 20, 2024

(54) POWER STORAGE DEVICE AND ELECTRONIC DEVICE

(71) Applicant: Semiconductor Energy Laboratory Co., Ltd., Atsugi (JP)

(72) Inventors: Masayuki Kimura, Atsugi (JP); Junya Goto, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 17/586,022

(22) Filed: Jan. 27, 2022

(65) Prior Publication Data

US 2022/0149462 A1     May 12, 2022

Related U.S. Application Data

(63) Continuation of application No. 16/353,414, filed on Mar. 14, 2019, now Pat. No. 11,239,516, which is a
(Continued)

(30) Foreign Application Priority Data

Apr. 23, 2015    (JP) ................................ 2015-088095

(51) Int. Cl.
*H01M 50/116*     (2021.01)
*H01M 10/04*     (2006.01)
(Continued)

(52) U.S. Cl.
CPC ... *H01M 10/0413* (2013.01); *H01M 10/0436* (2013.01); *H01M 50/107* (2021.01);
(Continued)

(58) Field of Classification Search
None
See application file for complete search history.

(56) References Cited

U.S. PATENT DOCUMENTS

| | | |
|---|---|---|
| 6,048,646 A | 4/2000 | Xing et al. |
| 6,376,109 B1 | 4/2002 | Sano et al. |

(Continued)

FOREIGN PATENT DOCUMENTS

| | | |
|---|---|---|
| CN | 102969529 A | 3/2013 |
| EP | 2363907 A | 9/2011 |

(Continued)

OTHER PUBLICATIONS

Jung.M et al., "Novel Nanostructured Si anode Behavior on Nanorod Array Polymer Substrate", PRIME (Pacific Rim Meeting), Oct. 7, 2012, p. 868, The Electrochemical Society.
(Continued)

*Primary Examiner* — Christopher P Domone
(74) *Attorney, Agent, or Firm* — Eric J. Robinson; Robinson Intellectual Property Law Office, P.C.

(57) ABSTRACT

To improve the flexibility of a power storage device, or provide a high-capacity power storage device. The power storage device includes a positive electrode, a negative electrode, an exterior body, and an electrolyte. The outer periphery of each of the positive electrode active material layer and the negative electrode active material layer is a closed curve. The exterior body includes a film and a thermocompression-bonded region. The inner periphery of the thermocompression-bonded region is a closed curve. The electrolyte, the positive electrode active material layer, and the negative electrode active material layer are in a region surrounded by the thermocompression-bonded region.

15 Claims, 32 Drawing Sheets

Related U.S. Application Data continuation of application No. 15/098,758, filed on Apr. 14, 2016, now Pat. No. 10,263,224.

(51) Int. Cl.
  *H01M 50/107* (2021.01)
  *H01M 50/124* (2021.01)
  *H01M 50/121* (2021.01)
  *H01M 50/119* (2021.01)
  *H01M 50/136* (2021.01)

(52) U.S. Cl.
  CPC ....... *H01M 50/119* (2021.01); *H01M 50/121* (2021.01); *H01M 50/124* (2021.01); *H01M 50/136* (2021.01); H01M 10/0459 (2013.01); H01M 2220/20 (2013.01); H01M 2220/30 (2013.01)

(56) References Cited

U.S. PATENT DOCUMENTS

| | | | |
|---|---|---|---|
| 7,045,438 | B2 | 5/2006 | Yamazaki et al. |
| 8,390,019 | B2 | 3/2013 | Yamazaki et al. |
| 8,940,429 | B2 | 1/2015 | Spare |
| 9,337,475 | B2 | 5/2016 | Takeuchi. et al. |
| 9,614,194 | B2 | 4/2017 | Murata et al. |
| 9,806,321 | B2 | 10/2017 | Yoo |
| 10,135,097 | B2 | 11/2018 | Spare |
| 2007/0087269 | A1 | 4/2007 | Inda |
| 2008/0311474 | A1 | 12/2008 | Ryou et al. |
| 2010/0239907 | A1 | 9/2010 | Izumi |
| 2010/0243050 | A1 | 9/2010 | Goldstein |
| 2011/0117417 | A1 | 5/2011 | Pitts |
| 2011/0206976 | A1 | 8/2011 | Yoo |
| 2011/0274955 | A1* | 11/2011 | Park ............. H01M 50/105 429/94 |
| 2012/0002349 | A1 | 1/2012 | Ito et al. |
| 2012/0064402 | A1 | 3/2012 | Tsuji et al. |
| 2012/0276434 | A1 | 11/2012 | Gaikwad et al. |
| 2012/0308891 | A1 | 12/2012 | Todoriki et al. |
| 2013/0134051 | A1 | 5/2013 | Takahashi et al. |
| 2013/0196210 | A1 | 8/2013 | Kim et al. |
| 2013/0224562 | A1 | 8/2013 | Momo |
| 2013/0236768 | A1 | 9/2013 | Park et al. |
| 2013/0252088 | A1 | 9/2013 | Kuriki et al. |
| 2013/0252089 | A1 | 9/2013 | Kuriki |
| 2013/0273405 | A1* | 10/2013 | Takahashi ......... H01M 10/0436 429/127 |
| 2014/0113184 | A1 | 4/2014 | Hamel et al. |
| 2014/0315091 | A1 | 10/2014 | Yamazaki et al. |
| 2014/0335391 | A1 | 11/2014 | Kwon et al. |
| 2015/0346766 | A1* | 12/2015 | Justice ................. H05K 7/06 429/100 |
| 2016/0043354 | A1 | 2/2016 | Han et al. |
| 2017/0092923 | A1 | 3/2017 | Pasma et al. |
| 2019/0074549 | A1 | 3/2019 | Spare |

FOREIGN PATENT DOCUMENTS

| | | |
|---|---|---|
| EP | 2709187 A | 3/2014 |
| EP | 3026729 A | 6/2016 |
| JP | 2000-228219 A | 8/2000 |
| JP | 2001-015165 A | 1/2001 |
| JP | 2001-068090 A | 3/2001 |
| JP | 2002-042775 A | 2/2002 |
| JP | 2002-298825 A | 10/2002 |
| JP | 2002-343340 A | 11/2002 |
| JP | 2003-208891 A | 7/2003 |
| JP | 2004-111219 A | 4/2004 |
| JP | 2004-241328 A | 8/2004 |
| JP | 2006-252802 A | 9/2006 |
| JP | 2007-234466 A | 9/2007 |
| JP | 2009-043719 A | 2/2009 |
| JP | 2010-080326 A | 4/2010 |
| JP | 2010-199281 A | 9/2010 |
| JP | 2010-219268 A | 9/2010 |
| JP | 2011-171303 A | 9/2011 |
| JP | 2012-113843 A | 6/2012 |
| JP | 2013-182677 A | 9/2013 |
| JP | 2013-191548 A | 9/2013 |
| JP | 2013-535774 | 9/2013 |
| JP | 2013-211262 A | 10/2013 |
| JP | 2014-060004 A | 4/2014 |
| JP | 2014-123445 A | 7/2014 |
| JP | 2015-038868 A | 2/2015 |
| WO | WO-2009/011371 | 1/2009 |
| WO | WO-2010/087123 | 8/2010 |
| WO | WO-2012/009423 | 1/2012 |
| WO | WO-2012/165358 | 12/2012 |

OTHER PUBLICATIONS

Chinese Office Action (Application No. 201610256756.1) dated Feb. 25, 2020.

* cited by examiner

107

175

POWER STORAGE DEVICE AND ELECTRONIC DEVICE

BACKGROUND OF THE INVENTION

1. Field of the Invention

One embodiment of the present invention relates to a power storage device and an electronic device.

Note that one embodiment of the present invention is not limited to the above technical field. One embodiment of the invention disclosed in this specification and the like relates to an object, a method, and a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

Note that electronic devices in this specification generally mean devices driven by electricity; and electro-optical devices, information terminal devices, and the like are all electronic devices. Some electronic devices incorporate a power storage device. Note that "incorporate" in this specification refers not only to incorporation of a power storage device in a manner that the device cannot be detached for replacement, but also to incorporation of a power storage device in a manner that the device as a form of battery pack or the like can be freely detached.

2. Description of the Related Art

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for the uses of electronic equipment, for example, portable information terminals such as mobile phones, smartphones, and laptop computers, portable music players, and digital cameras; medical equipment; and next-generation clean energy vehicles such as hybrid electric vehicles (HEVs), electric vehicles (EVs), and plug-in hybrid electric vehicles (PHEVs). The lithium-ion secondary batteries are essential for today's information society as rechargeable energy supply sources.

The development of wearable devices that are used while being worn by the users is also actively carried out. In order to be used more comfortably by the users, wearable devices often have curved shapes or have flexibility. In addition, power storage devices with flexibility and bendability to be incorporated in such wearable devices are being developed.

For example, Patent Document 1 discloses a sheet-like power storage device which can be bent in at least one axis direction, and electronic devices incorporating the power storage device. Patent Document 2 discloses a flexible secondary battery and an arm-worn electronic device including the secondary battery.

REFERENCES

Patent Documents

[Patent Document 1] Japanese Published Patent Application No. 2013-211262

[Patent Document 2] Japanese Published Patent Application No. 2015-38868

SUMMARY OF THE INVENTION

To offer wearable devices with a variety of functions and shapes, power storage devices need to have improved flexibility. In addition, the development of high-capacity power storage devices is required to reduce the frequency of charging wearable devices.

In view of the above, an object of one embodiment of the present invention is to improve the flexibility of a power storage device. Another object of one embodiment of the present invention is to provide a power storage device that can be bent in any direction. Another object of one embodiment of the present invention is to provide a high-capacity power storage device. Another object of one embodiment of the present invention is to provide a highly reliable power storage device.

Furthermore, an object of one embodiment of the present invention is to provide a flexible electronic device. Another object of one embodiment of the present invention is to provide an electronic device having a curved portion.

Furthermore, an object of one embodiment of the present invention is to provide a novel electrode, a novel power storage device, a novel electronic device, or the like. Note that the description of these objects does not exclude the existence of other objects. In one embodiment of the present invention, there is no need to achieve all the objects. Other objects will be apparent from and can be derived from the description of the specification, the drawings, the claims, and the like.

One embodiment of the present invention is a power storage device including a positive electrode, a negative electrode, an exterior body, and an electrolyte. The positive electrode includes a positive electrode current collector and a positive electrode active material layer in contact with the positive electrode current collector. The negative electrode includes a negative electrode current collector and a negative electrode active material layer in contact with the negative electrode current collector. The positive electrode active material layer and the negative electrode active material layer overlap with each other. The outer periphery of each of the positive electrode active material layer and the negative electrode active material layer is a closed curve. The exterior body includes a film and a thermocompression-bonded region. The inner periphery of the thermocompression-bonded region is a closed curve. The electrolyte, the positive electrode active material layer, and the negative electrode active material layer are in a region surrounded by the thermocompression-bonded region.

In the above embodiment, preferably, the outer periphery of each of the positive electrode active material layer and the negative electrode active material layer is approximately circular and the inner periphery of the thermocompression-bonded region is approximately circular.

Another embodiment of the present invention is a power storage device including a positive electrode, a negative electrode, an exterior body, and an electrolyte. The positive electrode includes a positive electrode current collector and a positive electrode active material layer in contact with the positive electrode current collector. The negative electrode includes a negative electrode current collector and a negative electrode active material layer in contact with the negative electrode current collector. The positive electrode active material layer and the negative electrode active material layer overlap with each other. The outer periphery of each of the positive electrode active material layer and the negative electrode active material layer is a closed curve. The exterior body includes a film. The exterior body includes a first thermocompression-bonded region and a second thermocompression-bonded region. The first thermocompression-bonded region is surrounded by the second thermocompression-bonded region. The outer periphery of the first thermocompression-bonded region is a closed curve. The inner periphery of the second thermocompression-bonded region is a closed curve. The exterior body includes an opening in a region surrounded by the first thermocompression-bonded region. The electrolyte, the positive electrode active material layer, and the negative electrode active material layer are in a region between the first thermocompression-bonded region and the second thermocompression-bonded region. The positive electrode current collector includes a portion extending in the opening. The negative electrode current collector includes a portion extending in the opening.

In the above embodiment, preferably, the outer periphery of each of the positive electrode active material layer and the negative electrode active material layer is approximately circular and the inner periphery of the second thermocompression-bonded region is approximately circular.

Another embodiment of the present invention is a power storage device including a positive electrode, a negative electrode, a positive electrode lead, a negative electrode lead, an exterior body, and an electrolyte. The positive electrode includes a positive electrode current collector and a positive electrode active material layer in contact with the positive electrode current collector. The negative electrode includes a negative electrode current collector and a negative electrode active material layer in contact with the negative electrode current collector. The positive electrode active material layer and the negative electrode active material layer overlap with each other.

The outer periphery of each of the positive electrode active material layer and the negative electrode active material layer is a closed curve. The exterior body includes a film. The exterior body includes a first thermocompression-bonded region and a second thermocompression-bonded region. The first thermocompression-bonded region is surrounded by the second thermocompression-bonded region. The outer periphery of the first thermocompression-bonded region is a closed curve. The inner periphery of the second thermocompression-bonded region is a closed curve. The exterior body includes an opening in a region surrounded by the first thermocompression-bonded region. The electrolyte, the positive electrode active material layer, and the negative electrode active material layer are in a region between the first thermocompression-bonded region and the second thermocompression-bonded region. The positive electrode lead is electrically connected to the positive electrode current collector in the region between the first thermocompression-bonded region and the second thermocompression-bonded region. The positive electrode lead includes a portion extending in the opening. The negative electrode lead is electrically connected to the negative electrode current collector in the region between the first thermocompression-bonded region and the second thermocompression-bonded region. The negative electrode lead includes a portion extending in the opening.

In the above embodiment, preferably, the outer periphery of each of the positive electrode active material layer and the negative electrode active material layer is approximately circular and the inner periphery of the second thermocompression-bonded region is approximately circular.

Another embodiment of the present invention is a power storage device with any of the above structures, in which the film has a projection or a depression. Another embodiment of the present invention is a power storage device with any of the above structures, in which the inner or outer periphery of the projection or the depression has a shape similar to that of the outer periphery of the positive electrode active material layer or the negative electrode active material layer.

In any of the above embodiments, preferably, the power storage device has flexibility.

Another embodiment of the present invention is an electronic device including the power storage device with any of the above structures and a housing having flexibility. Another embodiment of the present invention is an electronic device including the power storage device with any of the above structures and a housing having a curved portion.

According to one embodiment of the present invention, the flexibility of a power storage device can be improved. According to another embodiment of the present invention, a power storage device that can be bent in any direction can be provided. According to another embodiment of the present invention, a high-capacity power storage device can be provided. According to another embodiment of the present invention, a highly reliable power storage device can be provided.

Furthermore, according to one embodiment of the present invention, a flexible electronic device can be provided. According to another embodiment of the present invention, an electronic device having a curved portion can be provided.

Furthermore, a novel electrode, a novel power storage device, or a novel electronic device can be provided. Note that the description of these effects does not exclude the existence of other effects. In one embodiment of the present invention, there is no need to achieve all the effects. Other effects will be apparent from and can be derived from the description of the specification, the drawings, the claims, and the like.

BRIEF DESCRIPTION OF THE DRAWINGS

In the accompanying drawings:

FIGS. 23A and 23B illustrate conductive additives and the like;

FIGS. 24A and 24B illustrate conductive additives and the like;

DETAILED DESCRIPTION OF THE INVENTION

Figure 1A:
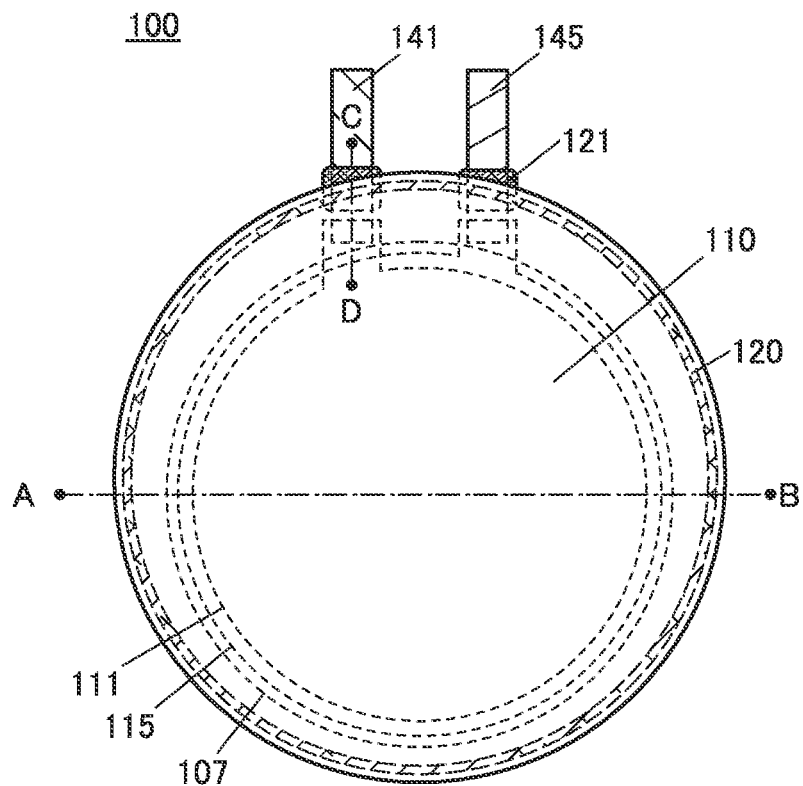
FIGS. 1A to 1D illustrate a power storage device of one embodiment of the present invention.

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to the description of the embodiments given below.

In this specification and the like, the term "connection" includes connection between components through an "object having any electric function". There is no particular limitation on the "object having any electric function" as long as electric signals can be transmitted and received between components that are connected through the object.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

The position, size, range, or the like of each component illustrated in drawings and the like is not accurately represented in some cases for easy understanding. Therefore, the disclosed invention is not necessarily limited to the position, size, range, or the like disclosed in the drawings and the like.

In this specification and the like, ordinal numbers such as "first", "second", and "third" are used in order to avoid confusion among components, and the terms do not mean limitation of the number of components.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly also includes the case where the angle is greater than or equal to 85° and less than or equal to 95°. In addition, the term "substantially perpendicular" indicates that the angle formed between two straight lines is greater than or equal to 60 20 and less than or equal to 120°.

Embodiment 1

In this embodiment, a power storage device of one embodiment of the present invention will be described with reference to FIGS. 1A to 9.

1. BASIC STRUCTURE

Figure 1B:
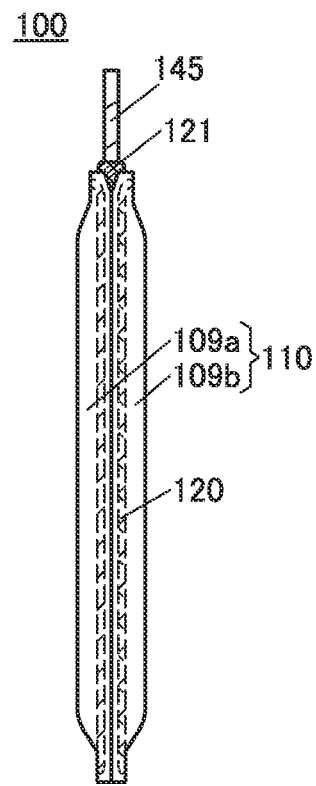
Figure 1C:
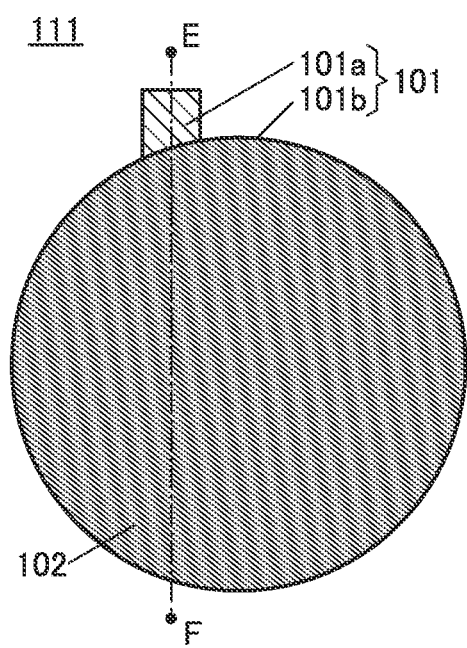

First, a power storage device 100 having a basic structure is described with reference to FIGS. 1A to 3C. FIG. 1A is a front view of the power storage device 100; FIG. 1B, a side view of the power storage device 100; FIG. 1C, a front view of a positive electrode 111 included in the power storage device 100; and FIG. 1D, a front view of a negative electrode 115 included in the power storage device 100.

Figure 1D:
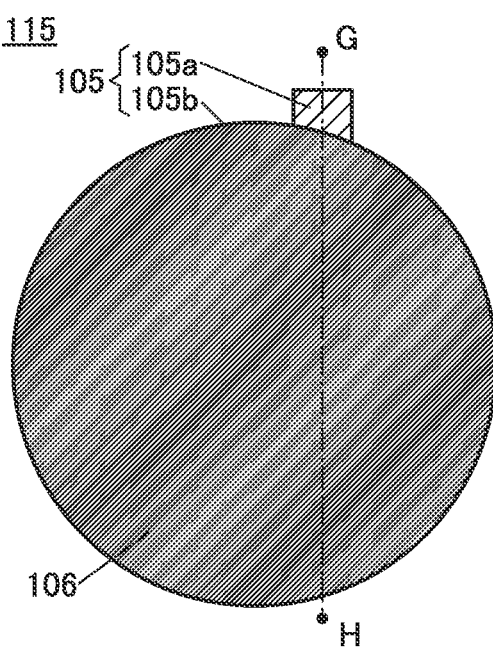
Figure 2A:
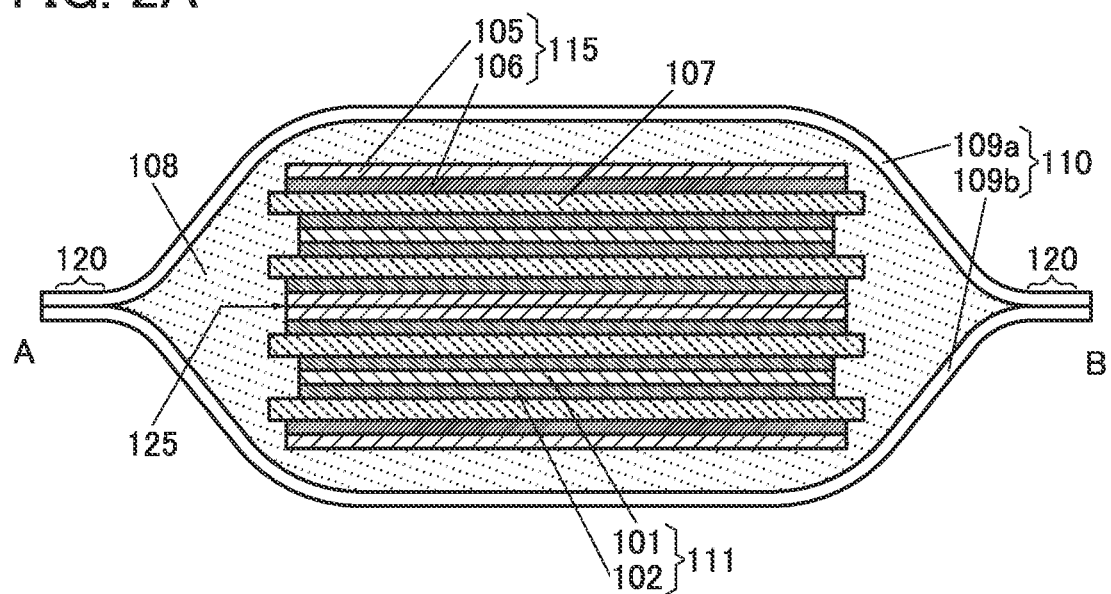
FIGS. 2A to 2D illustrate a power storage device of one embodiment of the present invention.
Figure 2B:
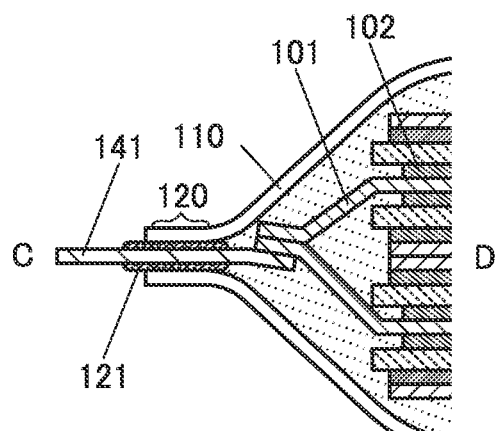
Figure 2C:
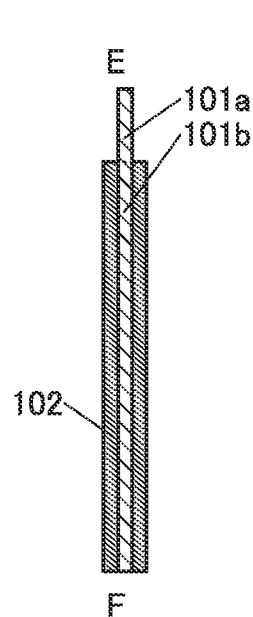
Figure 2D:
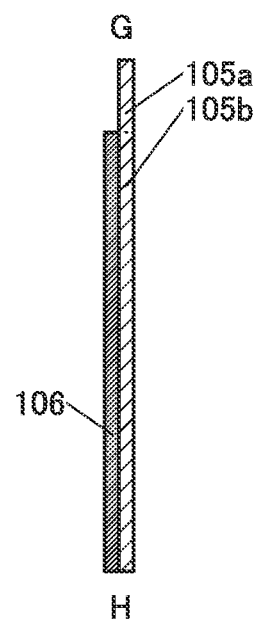

FIGS. 2A and 2B are cross-sectional views of the power storage device 100 illustrated in FIG. 1A along dashed-dotted line AB and dashed-dotted line CD, respectively. FIG. 2C is a cross-sectional view of the positive electrode 111 illustrated in FIG. 1C along dashed-dotted line EF. FIG. 2D is a cross-sectional view of the negative electrode 115 illustrated in FIG. 1D along dashed-dotted line GH.

As illustrated in FIGS. 1A and 1B, the power storage device 100 includes an exterior body 110, and a positive electrode lead 141 and a negative electrode lead 145 that serve as terminal electrodes. The exterior body 110 includes a thermocompression-bonded region 120, which is formed by overlapping a circular film 109a and a circular film 109b and heating the edges of the films. Part of each of the positive and negative electrode leads 141 and 145 is covered with the exterior body 110. The other part of each of the positive and negative electrode leads 141 and 145 extends to the outside of the exterior body 110. In addition, a sealing layer 121 made of a thermoplastic resin such as polypropylene (PP) is provided in part of each of the positive and negative electrode leads 141 and 145 that overlaps with the thermocompression-bonded region 120, thereby improving the adhesion between the films 109a and 109b, the adhesion between the positive electrode lead 141 and the films 109a and 109b, and the adhesion between the negative electrode lead 145 and the films 109a and 109b.

As described above, the power storage device 100 of one embodiment of the present invention includes the exterior body 110 formed using the films 109a and 109b. The use of the flexible films improves the flexibility of the power storage device 100.

As the films, a metal foil laminate film, which is formed by stacking a plastic film and metal foil, can be preferably used because it can be sealed by thermocompression bonding and has the advantages such as a high degree of shape freedom, lightweight, and flexibility. The metal foil included in the metal foil laminate film can be formed of aluminum, stainless steel, copper, tin, nickel steel, or the like. The plastic film stacked on the metal foil can be formed of polyethylene terephthalate, nylon, polyethylene, PP, or the like.

Note that in this specification and the like, "laminate" refers to a processing method by which thin materials, such as metal foil and a plastic film, are bonded so that they are stacked.

Alternatively, the films may each be a stack of metal foil and either a single-layer film selected from a hybrid material film including an organic material (e.g., an organic resin or fiber) and an inorganic material (e.g., ceramic), and a carbon-containing inorganic film (e.g., a carbon film or a graphite film), or a stacked-layer film including these films.

As described above, the power storage device 100 includes the thermocompression-bonded region 120 on the edge of the exterior body 110. The inner periphery of the thermocompression-bonded region 120 is preferably a closed curve as illustrated in FIG. 1A, in which case the power storage device 100 can be bent in any direction. Further preferably, the inner periphery of the thermocompression-bonded region 120 is circular or approximately circular. The reason for this is described with reference to FIGS. 3A to 3C.

Note that in this specification and the like, a closed curve refers to a continuous curve having no end points. Modes of the closed curve include a circle, an ellipse, a continuous shape consisting of curved portions with different curvatures, and the like.

When force is applied externally to the power storage device 100 to change its shape, compressive stress is applied to part of the exterior body 110 of the power storage device 100, and tensile stress is applied to the other part thereof. Due to the stress, the exterior body 110 is strained and might be partly deformed or broken.

Note that strain is the scale of change in form indicating the displacement of a point of an object relative to the reference (initial) length of the object.

Figure 3A:
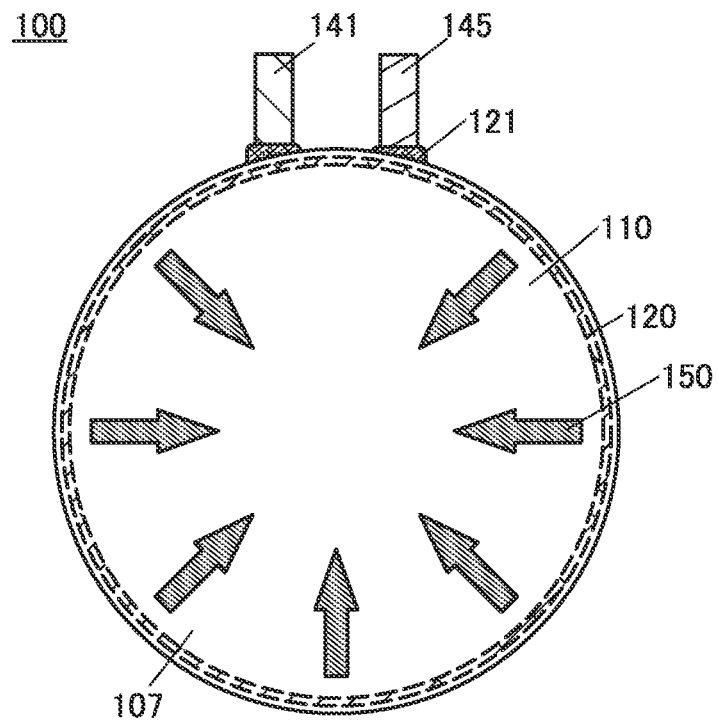
FIGS. 3A to 3C illustrate a power storage device of one embodiment of the present invention.
Figure 3B:
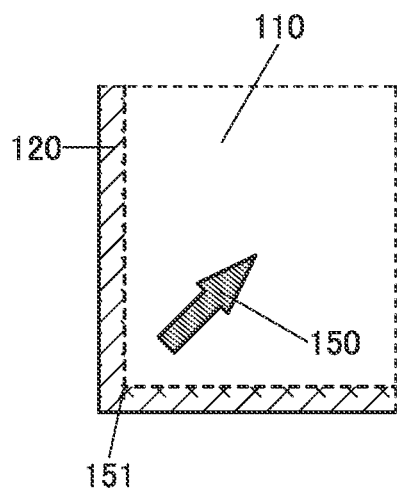
Figure 3C:
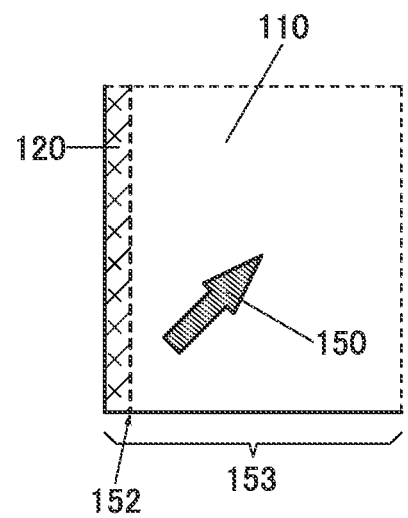

FIGS. 3A to 3C illustrate power storage devices with a variety of shapes, and the direction of stress applied to an exterior body when each power storage device is bent is indicated by an arrow 150. FIG. 3A is a front view of the power storage device 100. FIG. 3B illustrates part of a power storage device including a thermocompression-bonded region whose inner periphery has a polygonal shape. FIG. 3C illustrates part of a power storage device whose exterior body is formed by folding a film.

In the case where the inner periphery of the thermocompression-bonded region 120 has a polygonal shape as illustrated in FIG. 3B, the exterior body 110 includes a vertex 151. When the power storage device is bent by external force while stress is applied in the direction indicated by the arrow 150, the stress is likely to be concentrated on the vertex 151 and the periphery thereof. As a result, the exterior body 110 breaks at a portion subjected to the concentrated stress, such as the vertex 151 and the periphery thereof, which might cause danger such as leakage of electrolyte solution contained in the exterior body 110.

In the case where the exterior body is formed by folding a film at a bent portion 153 as illustrated in FIG. 3C, the exterior body includes a vertex 152 at which the inner periphery of the thermocompression-bonded region 120 intersects the bent portion 153. When the power storage device is bent and stress is applied in the direction indicated by the arrow 150, the stress is likely to be concentrated on the vertex 152 and the periphery thereof. As a result, the exterior body 110 possibly breaks at a portion subjected to the stress, such as the vertex 152 and the periphery thereof. In addition, the bent portion 153 breaks more easily than the thermocompression-bonded region 120 when being bent. Therefore, the power storage device with such a structure cannot be bent except in a restricted direction in order to prevent damage of the bent portion 153.

In contrast, in the power storage device 100 illustrated in FIG. 3A, the inner periphery of the thermocompression-bonded region is a closed curve, which includes no vertex. This prevents the exterior body 110 from breaking due to bending of the power storage device 100. Thus, the exterior body 110 is unlikely to break even when stress is applied in any direction as indicated by the arrows 150, resulting in improved flexibility of the power storage device 100. Furthermore, not including a bent portion which easily breaks due to bending, the power storage device 100 can be bent in any direction.

In addition, when the inner periphery of the thermocompression-bonded region 120 is circular or approximately circular, stress concentration can be prevented so that the exterior body 110 can be surely prevented from breaking when the power storage device 100 is bent.

As illustrated in FIGS. 2A and 2B, the power storage device 100 includes the positive electrode 111, the negative electrode 115, a separator 107, and an electrolyte solution 108 in a region that is sandwiched between the films 109a and 109b, which constitute the external body 110, and is surrounded by the thermocompression-bonded region 120. The positive electrode 111 includes a positive electrode current collector 101 and a positive electrode active material layer 102 in contact with the positive electrode current collector 101. The positive electrode lead 141 is connected to the positive electrode current collector 101. The negative electrode 115 includes a negative electrode current collector 105 and a negative electrode active material layer 106 in contact with the negative electrode current collector 105. The negative electrode lead 145 is connected to the negative electrode current collector 105 (not illustrated). Furthermore, the positive electrode active material layer 102 and the negative electrode active material layer 106 overlap with each other with the separator 107 positioned therebetween.

As illustrated in FIGS. 1C and 2C, in the positive electrode 111, the positive electrode current collector 101 includes a portion 101a not in contact with the positive electrode active material layer 102 and a portion 101b in contact with the positive electrode active material layer 102. The peripheries of the portion 101b and the positive electrode active material layer 102 are closed curves. The portion 101a can function as a tab (hereinafter also referred to as a positive electrode tab) that is used to electrically connect the positive electrode lead 141 to the positive electrode current collector 101.

As illustrated in FIGS. 1D and 2D, in the negative electrode 115, the negative electrode current collector 105 includes a portion 105a not in contact with the negative electrode active material layer 106 and a portion 105b in contact with the negative electrode active material layer 106. The peripheries of the portion 105b and the negative electrode active material layer 106 are closed curves. The portion 105a can function as a tab (hereinafter also referred to as a negative electrode tab) that is used to electrically connect the negative electrode lead 145 to the negative electrode current collector 105.

In the power storage device 100, in the case where the positive electrode active material layer 102 has a region that does not overlap with the negative electrode active material layer 106, a metal derived from carrier ions and the like contained in the electrolyte solution might be deposited on the negative electrode active material layer 106. Thus, the width of a surface of the negative electrode active material layer 106 that faces the positive electrode active material layer 102 is preferably greater than the width of a surface of the positive electrode active material layer 102 that faces the negative electrode active material layer 106 by 2% to 10%, more preferably 3% to 7%. As a result, the positive electrode active material layer 102 can surely overlap with the negative electrode active material layer 106 with the separator 107 positioned therebetween. In the case where both of the negative and positive electrode active material layers 106 and 102 are circular, the diameter of the negative electrode active material layer 106 is preferably greater than the diameter of the positive electrode active material layer 102 by 2% to 10%, more preferably 3% to 7%.

In the power storage device 100, as described above, the peripheries of the portion 101b of the positive electrode current collector 101, which is in contact with the positive electrode active material layer 102, and the positive electrode active material layer 102 are closed curves. Also, the peripheries of the portion 105b of the negative electrode current collector 105, which is in contact with the negative electrode active material layer 106, and the negative electrode active material layer 106 are closed curves. This structure including no corner and straight line portion, which are likely to cause damage of the exterior body 110, allows the power storage device 100 to be bent with little breakage of the exterior body 110.

Note that the peripheries of the portion 101b in contact with the positive electrode active material layer 102 and the positive electrode active material layer 102, and the peripheries of the portion 105b in contact with the negative electrode active material layer 106 and the negative electrode active material layer 106 are preferably circular or approximately circular. In that case, the region sandwiched between the films of the external body 110 and surrounded by the thermocompression-bonded region 120 can be utilized efficiently.

Note that the power storage device 100 uses the positive electrode 111 in which the positive electrode active material layer 102 is in contact with each surface of the positive electrode current collector 101, and the negative electrode 115 in which the negative electrode active material layer 106 is in contact with a surface of the negative electrode current collector 105. However, one embodiment of the present invention is not limited to this structure. The positive electrode 111 may include the positive electrode active material layer 102 in contact with a surface of the positive electrode current collector 101, or the negative electrode 115 may include the negative electrode active material layer 106 in contact with each surface of the negative electrode current collector 105.

Either the positive electrode 111 or the negative electrode 115, or both preferably include the active material layer in contact with each surface of the current collector, in which case the capacity per unit volume of the power storage device 100 can be increased.

Either the positive electrode 111 or the negative electrode 115, or both also preferably include the active material layer in contact with a surface of the current collector, in which case decreased capacity, degraded cycle performance, and the like due to bending of the power storage device 100 can be prevented.

For example, as illustrated in FIG. 2A, the negative electrode current collectors 105 are in contact with each other on a contact surface 125. These current collectors having the contact surface can slide on the contact surface, which can relieve the stress applied to the electrodes when the power storage device 100 is bent. It is thus possible to prevent breakage of the current collector or the active material layer due to bending of the power storage device 100, thereby preventing decreased capacity, degraded cycle performance, and the like of the power storage device 100.

Note that the number, size, stacking order, and the like of the positive electrode 111, the negative electrode 115, and the separator 107 used in the power storage device 100 are not limited to those in the above method. Other examples of the stack, which includes the positive electrode 111 provided with the positive electrode current collector 101 and the positive electrode active material layer 102, the negative electrode 115 provided with the negative electrode current collector 105 and the negative electrode active material layer 106, and the separator 107, are described with reference to FIGS. 4A to 4C.

Figure 4A:
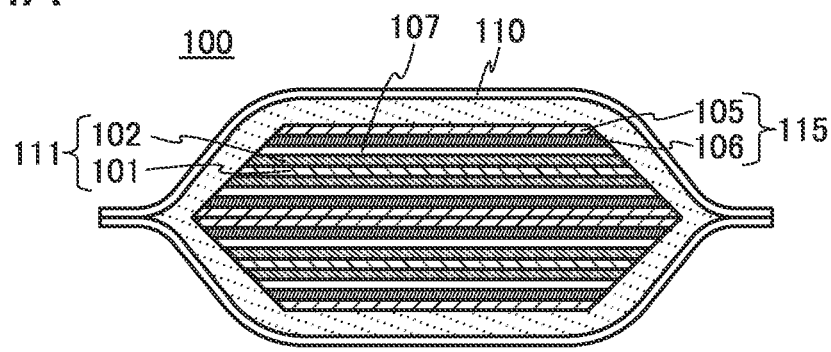
FIGS. 4A to 4C illustrate a power storage device of one embodiment of the present invention.

As illustrated in FIG. 4A, the stack in the power storage device 100 may have a tapered shape. This results in reduced effect of the corner of the stack on the exterior body 110, whereby the exterior body 110 is unlikely to break when the power storage device 100 is bent. Furthermore, the stack can be arranged so as to efficiently utilize the volume of the region sandwiched between the films of the external body 110 and surrounded by the thermocompression-bonded region.

The stack illustrated in FIG. 4A can be formed, for example, in the following manner. The positive electrode 111, the negative electrode 115, and the separator 107 are stacked; then, the stack is cut into a tapered shape with a cutter, a laser cutter, or the like. Alternatively, the positive electrode 111, the negative electrode 115, and the separator 107 are each cut with a cutter, a laser cutter, or the like to have tapered edges; then, they are stacked. Each edge of the positive electrode 111, the negative electrode 115, and the separator 107 is not necessarily tapered, and the positive electrode 111, the negative electrode 115, and the separator 107 with different sizes may be stacked to obtain a tapered stack.

Figure 4B:
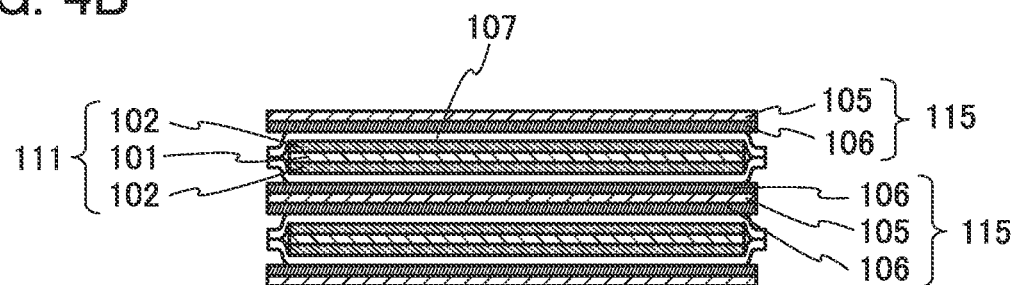

The stack may have a structure illustrated in FIG. 4B, which includes two positive electrodes 111 in each of which the positive electrode active material layer 102 is in contact with each surface of the positive electrode current collector 101; two negative electrodes 115 in each of which the negative electrode active material layer 106 is in contact with a surface of the negative electrode current collector 105; and one negative electrode 115 in which the negative electrode active material layer 106 is in contact with each surface of the negative electrode current collector 105. The active material layer provided on each surface of the current collector as illustrated in FIG. 4B contributes to an increase in the capacity per unit volume of the power storage device 100.

As in the stack illustrated in FIG. 4B, the separator 107 may have a bag-like shape so that the positive electrode 111 is enclosed therein. This structure surely prevents a contact and a short-circuit between the positive electrode 111 and the negative electrode 115.

Figure 4C:
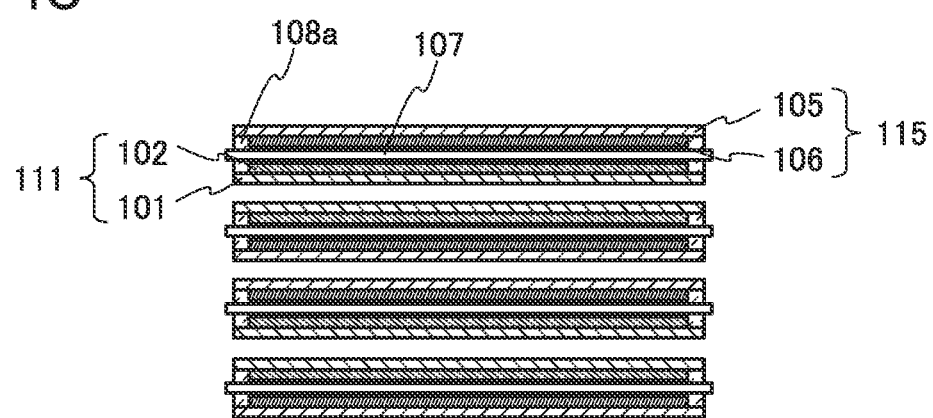

Furthermore, as illustrated in FIG. 4C, a gel electrolyte solution 108*a* may be used as the electrolyte solution 108 so that a pair of the positive electrode 111 and the negative electrode 115, and the separator 107 are bonded with the electrolyte solution 108. With this structure, the positive electrode 111 and the negative electrode 115 between which a battery reaction occurs can be prevented from sliding when the power storage device 100 is bent.

In addition, many contact surfaces between metals can be obtained: a contact surface between surfaces of the positive electrodes 111 on which the positive electrode active material is not provided; and a contact surface between surfaces of the negative electrodes 115 on which the negative electrode active material is not provided. This structure is preferable because the contact surfaces can slide to surely relieve the stress applied to the electrodes when the power storage device 100 is bent.

As a result, the power storage device 100 with little degradation, or the highly reliable power storage device 100 can be provided.

Figure 5A:
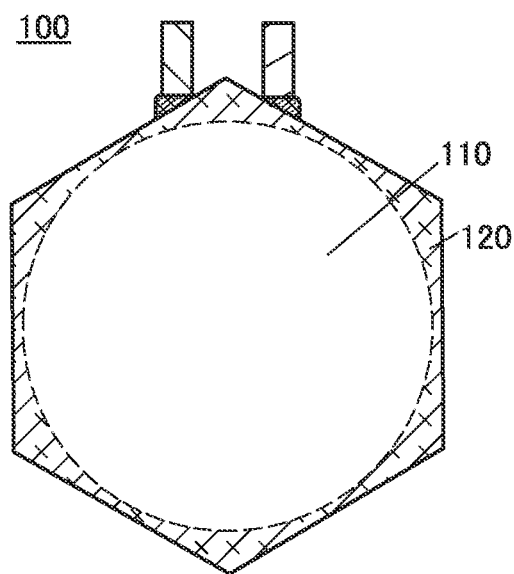
FIGS. 5A to 5C illustrate a power storage device of one embodiment of the present invention.
Figure 5B:
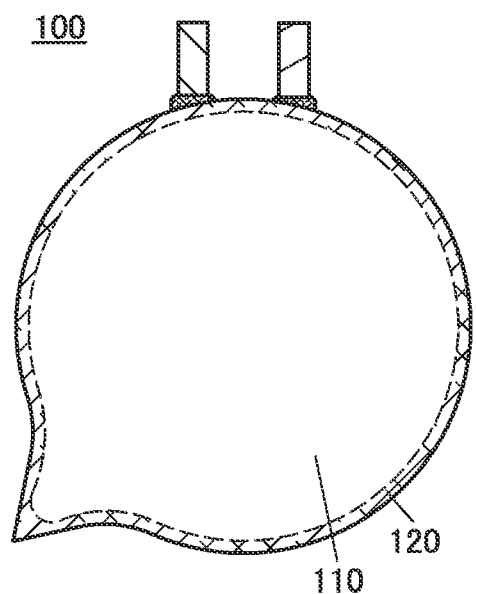

Note that in the power storage device 100 illustrated in FIGS. 1A to 1D, the outer periphery of the thermocompression-bonded region 120 is circular; however, one embodiment of the present invention is not limited to this. For example, the outer periphery of the thermocompression-bonded region 120 may have a polygonal shape as illustrated in FIG. 5A, or may have a projection as illustrated in FIG. 5B.

Figure 5C:
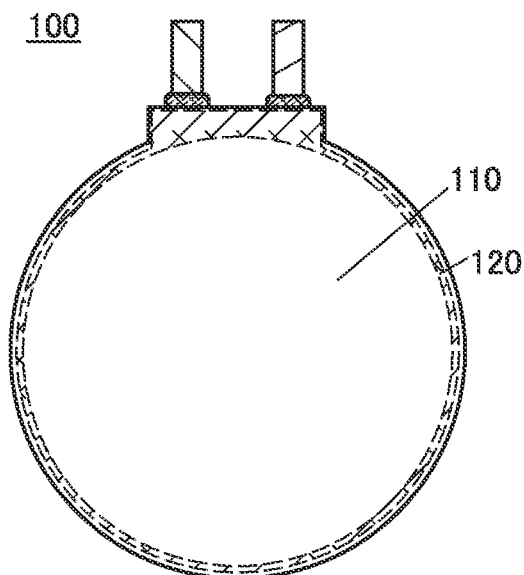

Furthermore, in the power storage device 100 illustrated in FIGS. 1A to 1D and FIGS. 2A to 2D, the thermocompression-bonded region 120 has the same width in all areas; however, one embodiment of the present invention is not limited to this and the thermocompression-bonded region 120 may have the same width or different widths. For example, as illustrated in FIG. 5C, the thermocompression-bonded region 120 may have a larger width in a portion overlapping with the positive and negative electrode leads 141 and 145. This structure is preferable because the positive and negative electrode leads 141 and 145 can be fixed to the exterior body 110 more firmly.

Modification examples of the power storage device 100 will be described below. Note that for the structures, reference numerals, and drawings that are not specifically described in the modification examples, the description of Basic structure can be referred to.

2. MODIFICATION EXAMPLE 1

Figure 6A:
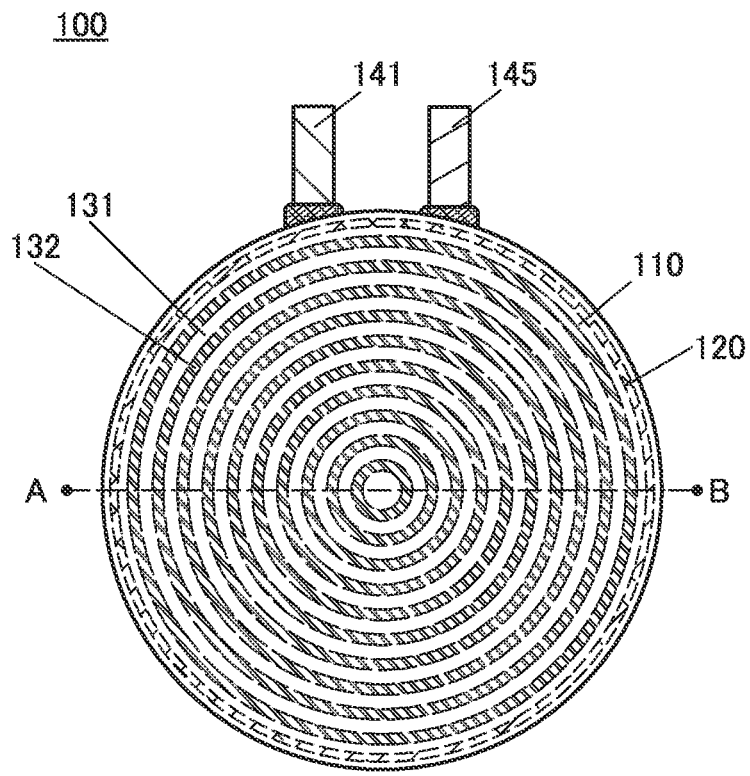
FIGS. 6A and 6B illustrate a power storage device of one embodiment of the present invention.
Figure 6B:
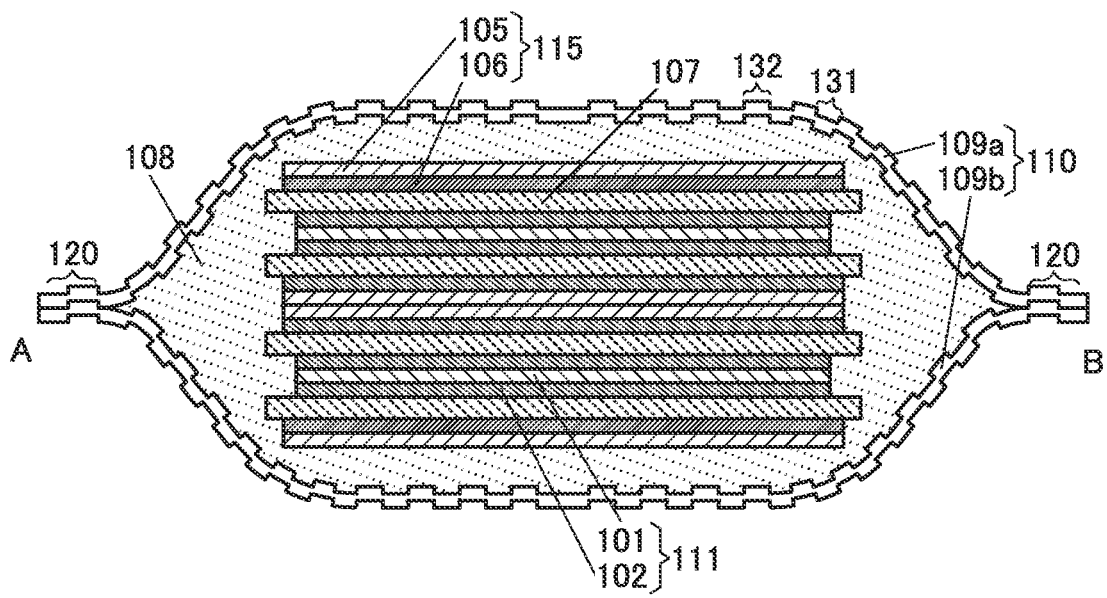

Modification example 1 of the power storage device 100 is described with reference to FIGS. 6A and 6B. FIG. 6A is a front view of the power storage device 100. FIG. 6B is a cross-sectional view of the power storage device 100 along dashed-dotted line AB in FIG. 6A.

As illustrated in FIGS. 6A and 6B, in the power storage device 100, the films 109*a* and 109*b* of the exterior body 110 may have depressions 131 and projections 132. The depressions and the projections can be formed by embossing or the like. The aforementioned materials for the films can be easily embossed. The exterior body 110 including the depressions or the projections, which are formed by embossing, has an increased surface area exposed to the air, improving the heat dissipation effect of the power storage device 100.

In addition, the depressions or the projections on the exterior body 110 contribute to suppression of breakage or the like of the exterior body 110 even when the exterior body 110 is strained by force applied from the outside of the power storage device 100.

Furthermore, the depressions or the projections formed on the exterior body 110 by embossing or the like can increase the creeping distance of the exterior body 110 and can relieve compressive stress and tensile stress per unit length. As a result, the reliability of the power storage device 100 can be improved.

The depressions and projections on the exterior body 110 can thus relieve the strain occurring when the films 109*a* and 109*b* receive stress due to bending of the power storage device 100. Accordingly, deformation or breakage of the films 109*a* and 109*b* can be prevented.

The depressions 131 or the projections 132 of the films 109*a* and 109*b* preferably have a shape similar to that of the positive electrode active material layer 102 or the negative electrode active material layer 106, in which case strain can be relieved more easily.

More specifically, the inner periphery of the depressions 131 or the projections 132 preferably has a shape similar to that of the outer periphery of the positive electrode active material layer 102 or the negative electrode active material layer 106. Alternatively, the outer periphery of the depressions 131 or the projections 132 preferably has a shape similar to that of the outer periphery of the positive electrode active material layer 102 or the negative electrode active material layer 106.

Figure 7:
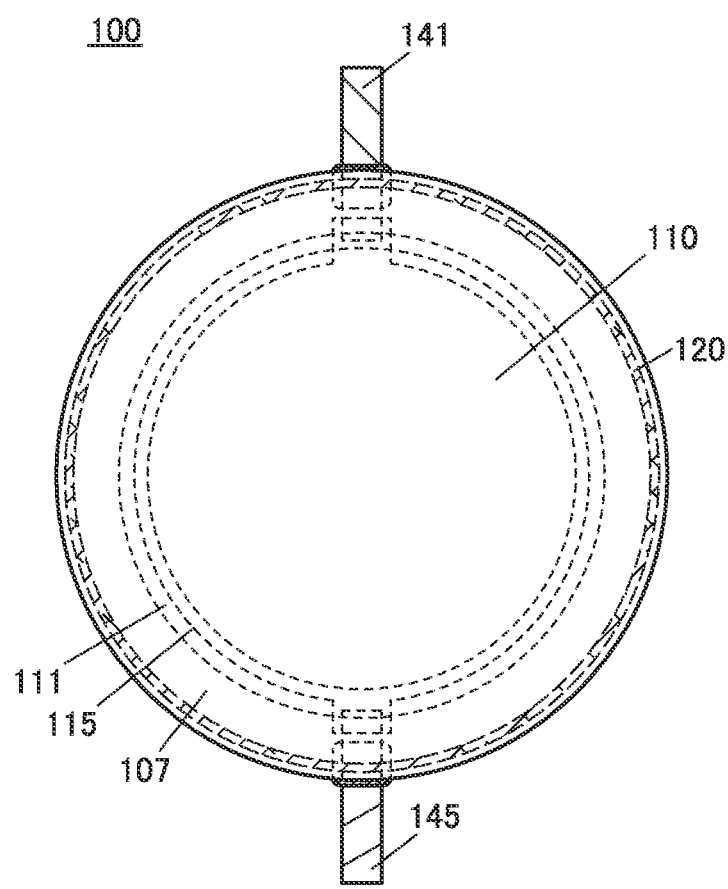
FIG. 7 illustrates a power storage device of one embodiment of the present invention.

Basic structure and Modification example 1 show an example in which the positive electrode lead 141 and the negative electrode lead 145 are close to each other; however, one embodiment of the present invention is not limited to this and as illustrated in FIG. 7, the positive electrode lead 141 and the negative electrode lead 145 may be arranged apart from each other. Also, the positive electrode lead 141 and the negative electrode lead 145 are not necessarily parallel to each other.

Basic structure and Modification example 1 show an example in which the positive electrode lead 141 and the negative electrode lead 145 serving as terminal electrodes extend to the outside of the exterior body 110. Alternatively, the positive electrode lead 141 and the negative electrode lead 145 may extend in an opening in the exterior body 110 as shown in Modification examples 2 and 3 below.

3. MODIFICATION EXAMPLE 2

Figure 8A:
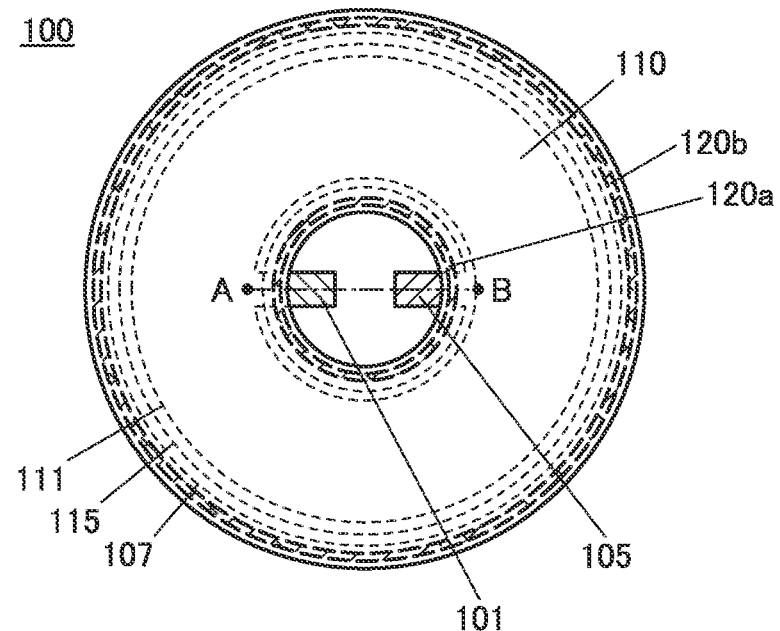
FIGS. 8A to 8C illustrate a power storage device of one embodiment of the present invention.
Figure 8B:
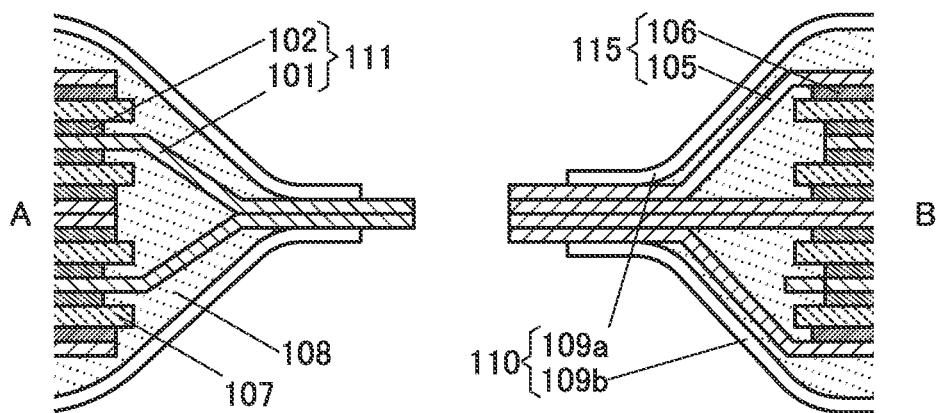

Modification example 2 of the power storage device 100 is described with reference to FIGS. 8A to 8C. FIG. 8A is a front view of the power storage device 100. FIG. 8B is a cross-sectional view of the power storage device 100 along dashed-dotted line AB in FIG. 8A.

As illustrated in FIGS. 8A and 8B, the exterior body 110 may have an opening. The exterior body 110 includes two circular films 109*a* and 109*b* each of which has a circular opening at the center and which overlap with each other; a thermocompression-bonded region 120*a* formed by heating the periphery of the openings of the films 109*a* and 109*b*; and a thermocompression-bonded region 120*b* formed by heating the periphery of the films 109*a* and 109*b*.

In the power storage device 100 shown in this modification example, the outer periphery of the thermocompression-bonded region 120a and the inner periphery of the thermocompression-bonded region 120b are preferably closed curves, in which case breakage of the exterior body 110 due to bending of the power storage device 100 can be prevented. In addition, the outer periphery of the thermocompression-bonded region 120a and the inner periphery of the thermocompression-bonded region 120b are further preferably circular or approximately circular, in which case breakage of the exterior body 110 can be prevented more surely.

The positive electrode 111 has an opening, and includes the positive electrode current collector 101 and the positive electrode active material layer 102 in contact with the positive electrode current collector 101. The negative electrode 115 has an opening, and includes the negative electrode current collector 105 and the negative electrode active material layer 106 in contact with the negative electrode current collector 105. Furthermore, the positive electrode active material layer 102 and the negative electrode active material layer 106 overlap with each other with the separator 107 positioned therebetween. The electrolyte solution 108, the positive electrode active material layer 102, the negative electrode active material layer 106, and the separator 107 are in a region sandwiched between the films 109a and 109b and between the thermocompression-bonded regions 120a and 120b.

A portion of the positive electrode current collector 101 that is not in contact with the positive electrode active material layer 102 is located near the center of the positive electrode 111. A portion of the negative electrode current collector 105 that is not in contact with the negative electrode active material layer 106 is located near the center of the negative electrode 115.

The portion of the positive electrode current collector 101 that is not in contact with the positive electrode active material layer 102 and the portion of the negative electrode current collector 105 that is not in contact with the negative electrode active material layer 106 are partly surrounded by the exterior body 110, and partly extend to the outside of the exterior body 110.

Note that the two positive electrode current collectors 101 overlap with each other and are bonded by ultrasonic welding to form a stack. Furthermore, the four negative electrode current collectors 105 overlap with each other and are bonded by ultrasonic welding to form a stack. Such a structure allows terminal electrodes to be formed without use of lead electrodes.

The power storage device 100 shown in this modification example includes terminals in the center and the center is fixed by thermocompression bonding. Accordingly, even when the power storage device is bent by external force, the terminal electrodes and the vicinity thereof are hardly changed in shape. Thus, damage of the terminal electrodes can be reduced, and furthermore, the number of components can be reduced because no lead electrode is used.

Figure 8C:
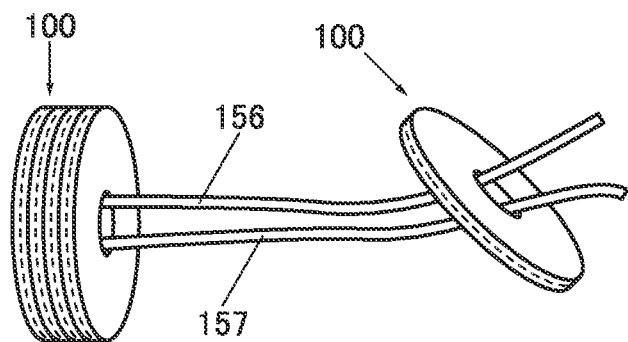

Note that when a plurality of the power storage devices 100 shown in this modification example are stacked and the terminal electrodes of the power storage devices 100 are connected to a wiring 156 or a wiring 157 as illustrated in FIG. 8C, a power storage device with a cylindrical shape can be obtained.

Note that this structure makes it difficult to firmly attach the films 109a and 109b to the current collectors when a larger number of current collectors are used to increase the thickness of the stack used as a terminal electrode. Thus, a sealing layer may be provided on the portion of the positive electrode current collector 101 that is not in contact with the positive electrode active material layer 102 and the portion of the negative electrode current collector 105 that is not in contact with the negative electrode active material layer 106, thereby increasing the adhesion between the films 109a and 109b, and the adhesion between the terminal electrode and each of the films.

Figure 9:
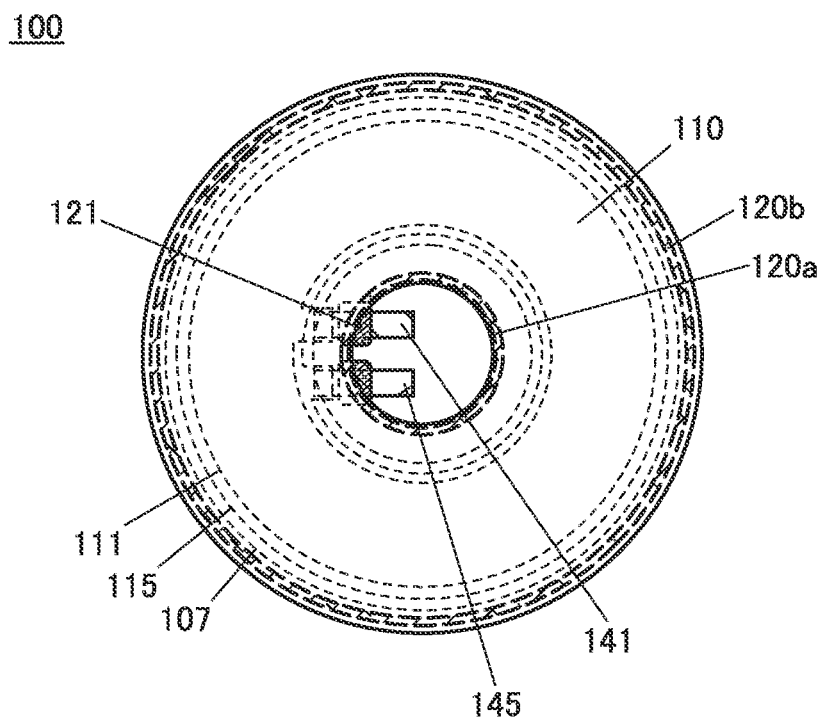
FIG. 9 illustrates a power storage device of one embodiment of the present invention.
Figure 10A:
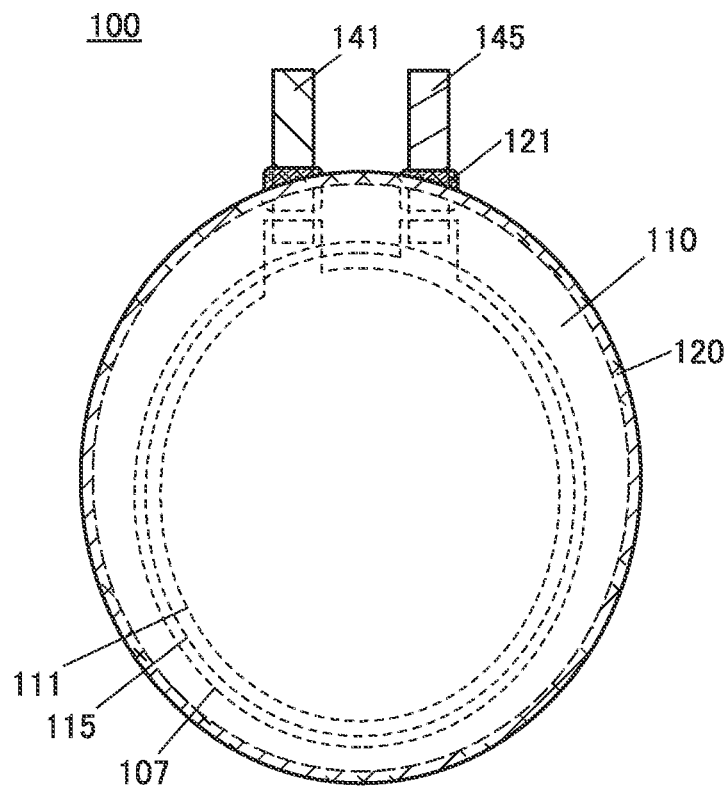
FIGS. 10A to 10D illustrate a power storage device of one embodiment of the present invention.
Figure 10B:
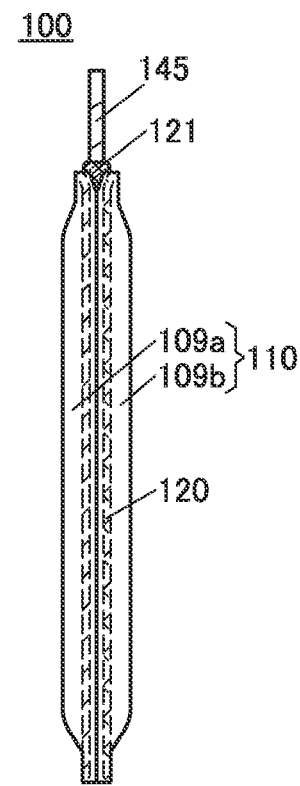
Figure 10C:
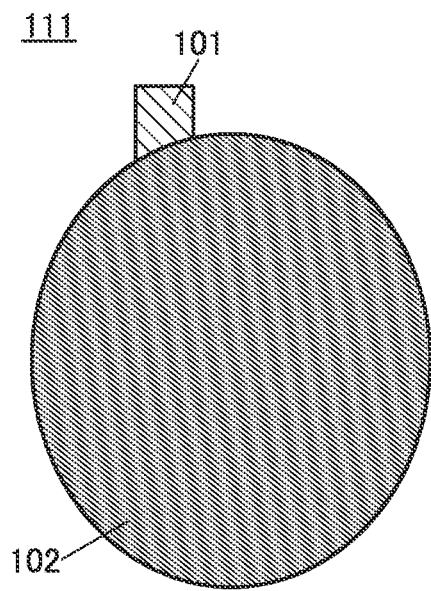
Figure 10D:
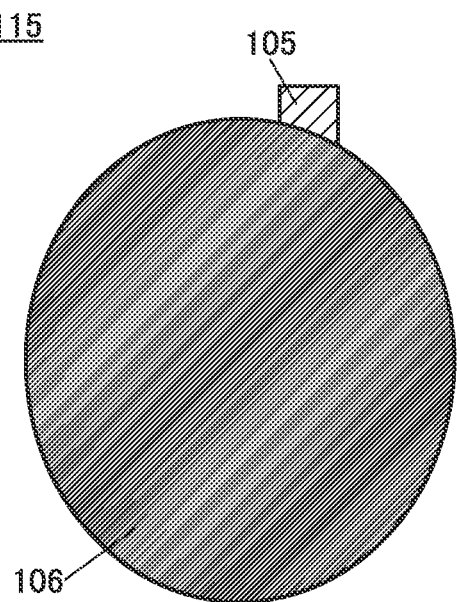
Figure 11A:
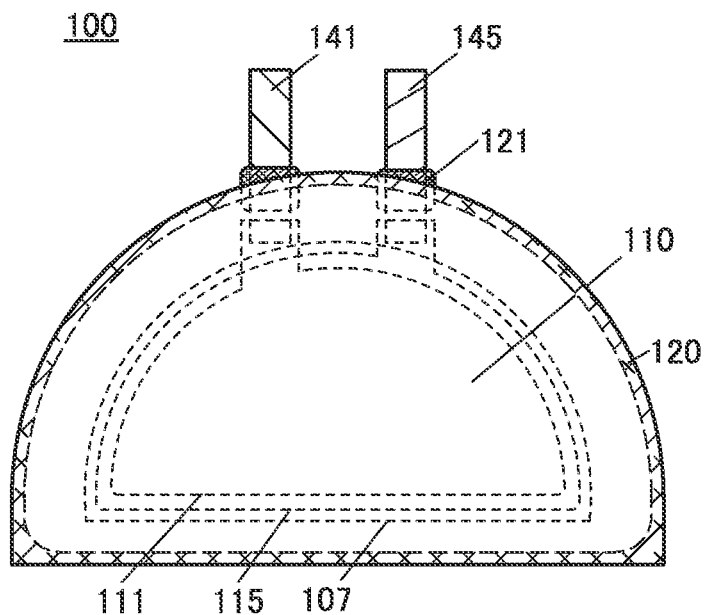
FIGS. 11A to 11D illustrate a power storage device of one embodiment of the present invention.
Figure 11B:
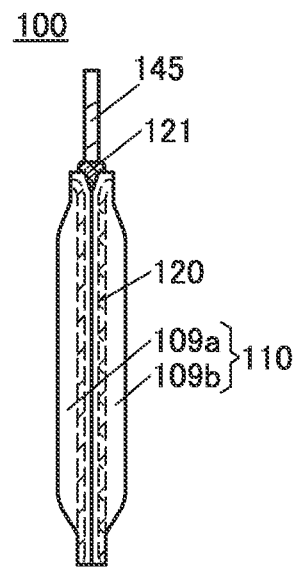
Figure 11C:
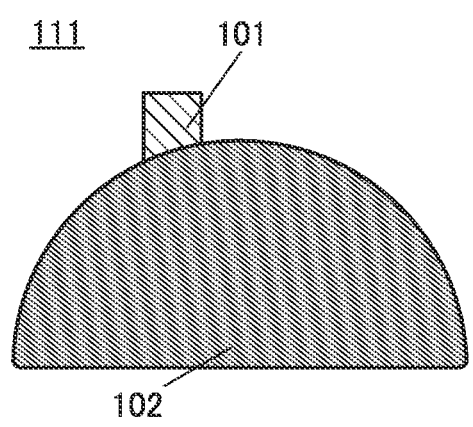
Figure 11D:
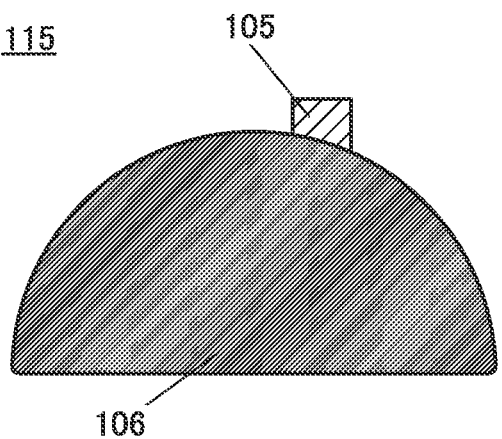
Figure 12A:
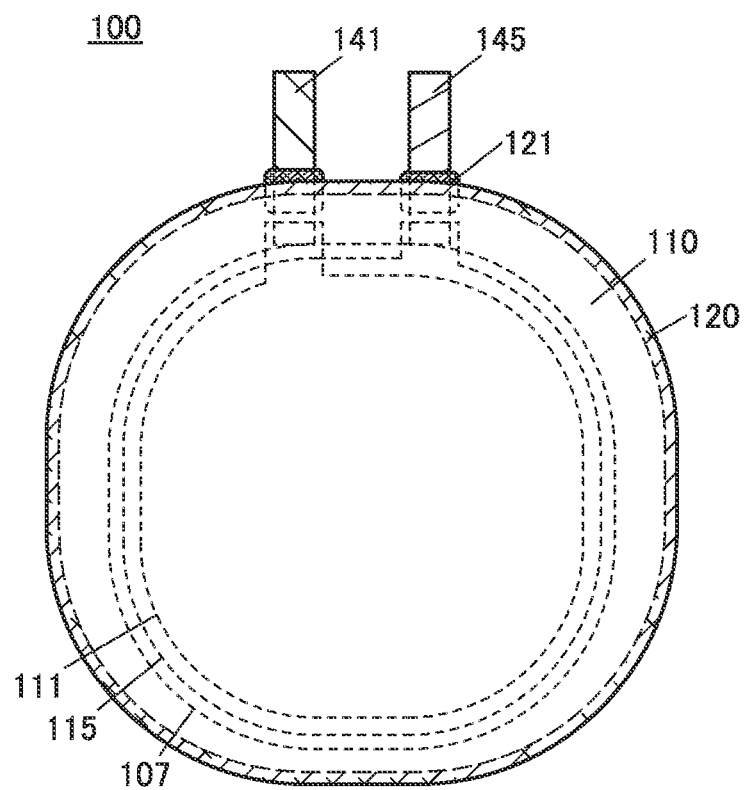
FIGS. 12A to 12D illustrate a power storage device of one embodiment of the present invention.
Figure 12B:
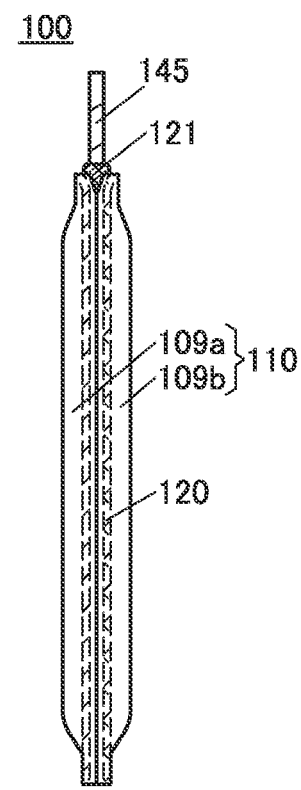
Figure 12C:
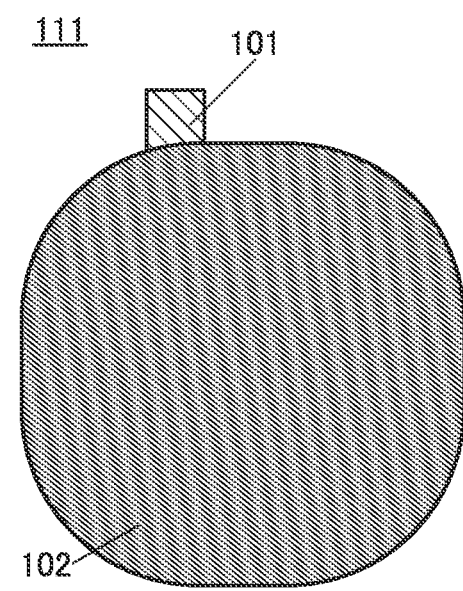
Figure 12D:
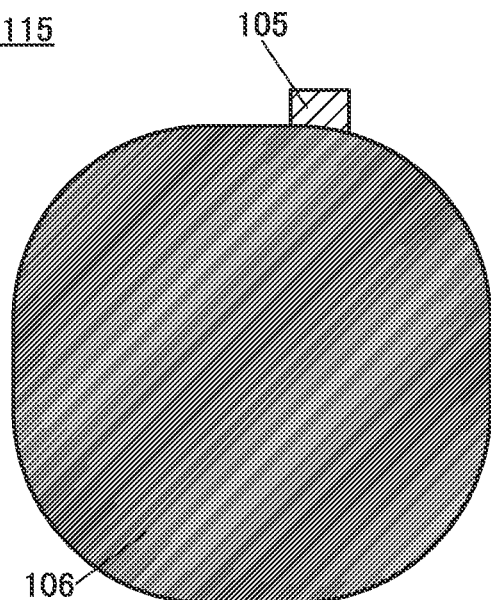

The power storage device 100 with an opening may have a structure illustrated in FIG. 9 as shown in Modification example 3.

4. MODIFICATION EXAMPLE 3

The power storage device 100 illustrated in FIG. 9 includes the exterior body 110 having an opening. The power storage device 100 also includes the positive electrode lead 141, the negative electrode lead 145, and the sealing layer 121.

Part of each of the positive and negative electrode leads 141 and 145 is covered with the exterior body 110. The other part of each of the positive and negative electrode leads 141 and 145 extends from the exterior body 110 to the opening in the exterior body 110. In a region covered with the exterior body 110, the positive electrode lead 141 is connected to the positive electrode 111 and the negative electrode lead 145 is connected to the negative electrode 115.

The sealing layer 121 provided on the positive electrode lead 141 and the negative electrode lead 145 contributes to an increase in the adhesion between the films of the exterior body 110. Note that the positive electrode lead 141 and the negative electrode lead 145 are not necessarily provided with the sealing layer 121.

There is no particular limitation on the positions of the parts of the positive electrode lead 141 and the negative electrode lead 145 that extend in the opening in the exterior body 110; they may be close to or far from each other.

5. OTHER MODIFICATION EXAMPLES

Next, other examples of the shape of the power storage device 100 will be introduced with reference to FIGS. 10A to 12D.

As described above, preferably, the outer peripheries of the positive and negative electrode active material layers are closed curves and the inner periphery of the thermocompression-bonded region is a closed curve in the power storage device 100. Basic structure shows an example in which the outer peripheries of the positive and negative electrode active material layers are circular and the inner periphery of the thermocompression-bonded region is circular; however, this embodiment is not limited to this, and the outer peripheries of the positive and negative electrode active material layers may be any other closed curve. The inner periphery of the thermocompression-bonded region may also be any other closed curve.

For example, as illustrated in FIGS. 10A to 10D, the power storage device 100 may include an elliptical exterior body 110, the positive electrode 111 including an elliptical positive electrode active material layer 102, the negative electrode 115 including an elliptical negative electrode active material layer 106, and an elliptical separator 107. Furthermore, the inner periphery of the thermocompression-bonded region 120 in the exterior body 110 may have an elliptical shape.

In some cases, the outer periphery of each of the positive and negative electrode active material layers may have a shape with a linear portion, and the inner periphery of the thermocompression-bonded region may have a shape with a curved portion. For example, as illustrated in FIGS. 11A to 11D, the power storage device 100 may include a semicircular exterior body 110, the positive electrode 111 including a semicircular positive electrode active material layer 102, the negative electrode 115 including a semicircular negative electrode active material layer 106, and a semicircular separator 107. Furthermore, the inner periphery of the thermocompression-bonded region 120 may be semicircular in the exterior body 110.

Alternatively, as illustrated in FIGS. 12A to 12D, the power storage device 100 may include an exterior body 110 with a round-corner quadrilateral, the positive electrode 111 including a positive electrode active material layer 102 with a round-corner quadrilateral, the negative electrode 115 including a negative electrode active material layer 106 with a round-corner quadrilateral, and a separator 107 with a round-corner quadrilateral. Furthermore, the inner periphery of the thermocompression-bonded region 120 in the exterior body 110 may be a round-corner quadrilateral.

Even in the case where the positive electrode active material layer 102 and the negative electrode active material layer 106 each have a shape with a linear portion as illustrated in FIGS. 11A to 12D, the exterior body 110 is unlikely to be damaged when the use method or the bending direction of the power storage device is selected as appropriate.

This embodiment can be implemented in appropriate combination with any of the other embodiments.

Embodiment 2

In this embodiment, an example of a method for manufacturing the power storage device 100 of one embodiment of the present invention will be described with reference to FIGS. 13A to 21F. Shown as an example is a method for manufacturing the power storage device 100 with the basic structure (see FIGS. 1A to 2D) described in Embodiment 1.

[1. Preparation of Positive Electrode and Covering with Separator]

First, the positive electrode active material layer 102 is formed on both surfaces of the positive electrode current collector 101, and processed into a shape of the positive electrode 111. Then, the positive electrode 111 is sandwiched between the two separators 107 (FIG. 13A).

Figure 13A:
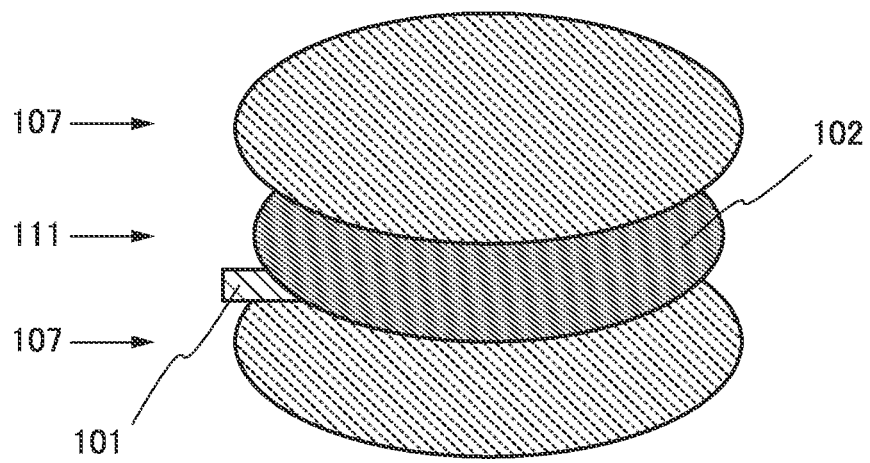
FIGS. 13A to 13C illustrate a method for manufacturing a power storage device of one embodiment of the present invention.
Figure 13B:
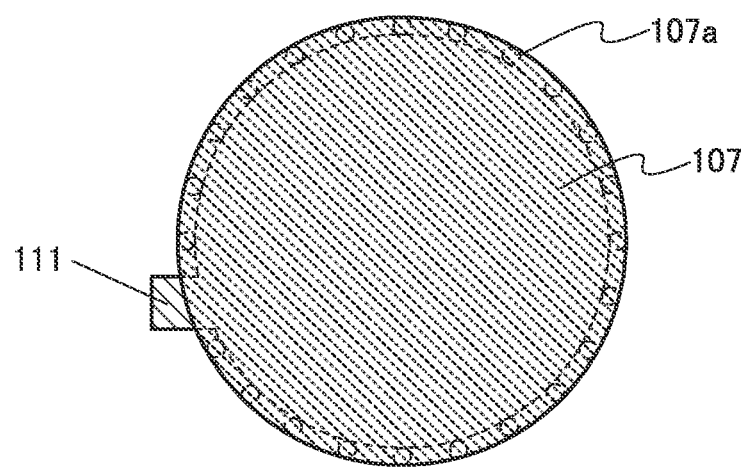

Then, the outer edges of the separators 107 outside the positive electrode 111 are bonded to form a bag-like separator 107 (FIG. 13B). The bonding of the outer edges of the separators 107 can be performed with the use of an adhesive or the like, by ultrasonic welding, or by thermal fusion bonding.

In this embodiment, polypropylene is used as the separators 107, and the outer edges of the separators 107 are bonded by heating. The bonding portion is shown as a region 107a in FIG. 13B. In this manner, the positive electrode 111 can be covered with the separators 107. The separators 107 are formed so as to cover the positive electrode active material layer 102 and does not necessarily cover the whole positive electrode 111.

Note that the positive electrode 111 is sandwiched between the two separators 107 in FIG. 13A; however, one embodiment of the present invention is not limited to this. For example, a single separator may be folded so as to sandwich the positive electrode 111.

The outer edges of the separators 107 may be bonded intermittently or bonded at points with regular intervals as in FIG. 13B.

Note that the shape of the separator 107 is not limited to the bag-like shape. The separator 107 may have any shape that prevents the contact between the positive electrode 111 and the negative electrode 115 in the power storage device 100, and may have, for example, a flat-plate shape. In addition, the positive electrode 111 is not necessarily sandwiched between the separators 107 in the case where the positive electrode 111 includes the positive electrode active material layer 102 on only one surface of the positive electrode current collector 101.

[2. Preparation of Negative Electrode]

Figure 13C:
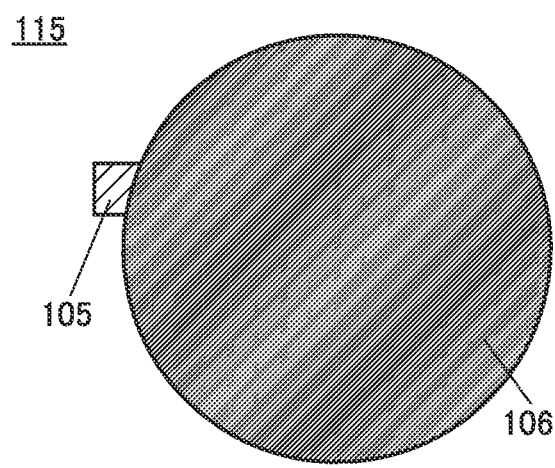

Next, the negative electrode active material layer 106 is formed on the negative electrode current collector 105, and processed into a shape of the negative electrode 115 (FIG. 13C).

[3. Stack of Positive and Negative Electrodes]

Figure 14A:
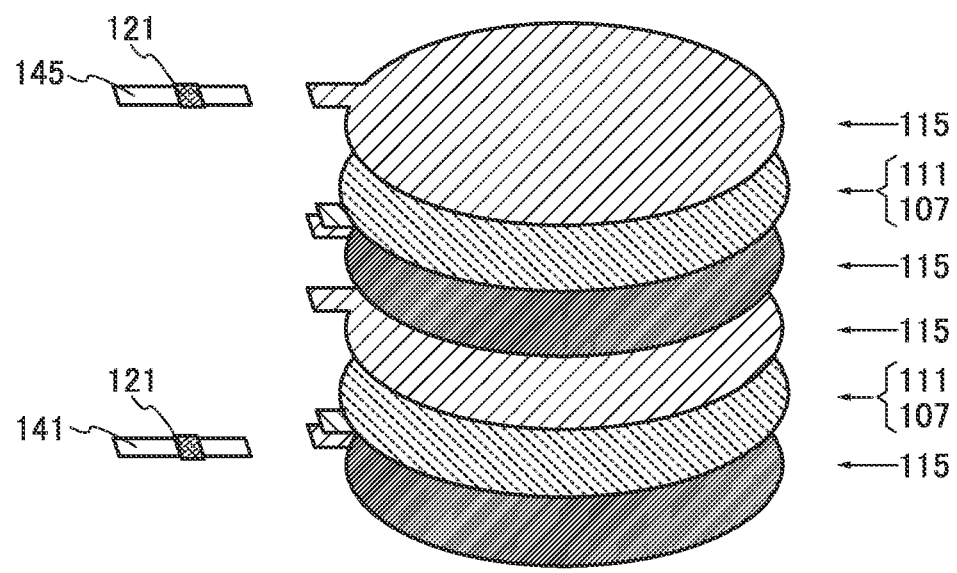
FIGS. 14A and 14B illustrate a method for manufacturing a power storage device of one embodiment of the present invention.

Then, the positive electrodes 111 and the negative electrodes 115 are stacked (FIG. 14A). In this embodiment, two positive electrodes 111 each having the positive electrode active material layer on both surfaces of the positive electrode current collector, and four negative electrodes 115 each having the negative electrode active material layer on one surface of the negative electrode current collector are stacked. The positive electrodes 111 and the negative electrodes 115 are positioned so that the positive electrode active material layer 102 and the negative electrode active material layer 106 overlap with each other with the separator 107 provided therebetween. Furthermore, the surfaces of the negative electrodes 115 that are not provided with the negative electrode active material layer 106 are in contact with each other.

[4. Connection between Positive and Negative Electrode Leads]

Next, the positive electrode lead 141 including the sealing layer 121 is electrically connected to positive electrode tabs of the plurality of positive electrode current collectors 101 by ultrasonic wave irradiation while pressure is applied (ultrasonic welding).

The lead electrode is likely to be cracked or cut by stress due to external force applied after the fabrication of the power storage device. Thus, when subjected to ultrasonic welding, the positive electrode lead 141 is placed between bonding dies provided with projections, whereby a connection region and a curved portion can be formed in the positive electrode tab. This curved portion can relieve the stress caused by external force applied after the fabrication of the power storage device 100, thereby improving the reliability of the power storage device 100.

Other than the formation of the curved portion in the positive electrode tab, the following may be employed: the positive electrode current collector is formed using a high-strength material such as stainless steel or titanium to a thickness of less than or equal to 10 μm, so that stress due to external force that is applied after the fabrication of the power storage device can be easily relieved.

It is needless to say that two or more of the above examples may be combined to alleviate the concentration of stress in the positive electrode tab.

Figure 14B:
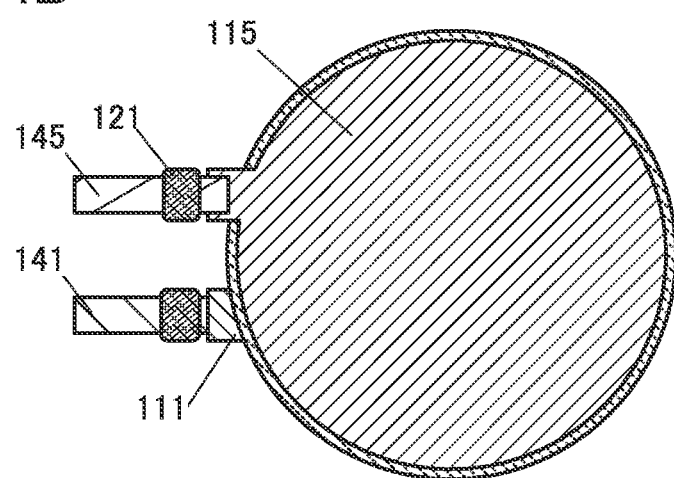

As in the case of the positive electrode current collector 101, negative electrode tabs of a plurality of negative electrode current collectors 105 and the negative electrode lead 145 provided with the sealing layer 121 are electrically connected to each other by ultrasonic welding (FIG. 14B). At this time, structures which can easily relieve stress can be employed as in the case of the positive electrode tabs; for example, the negative electrode tab is provided with a curved portion or the current collector is formed using a high-strength material.

[5. Bonding of Part of Exterior Body]

Figure 15A:
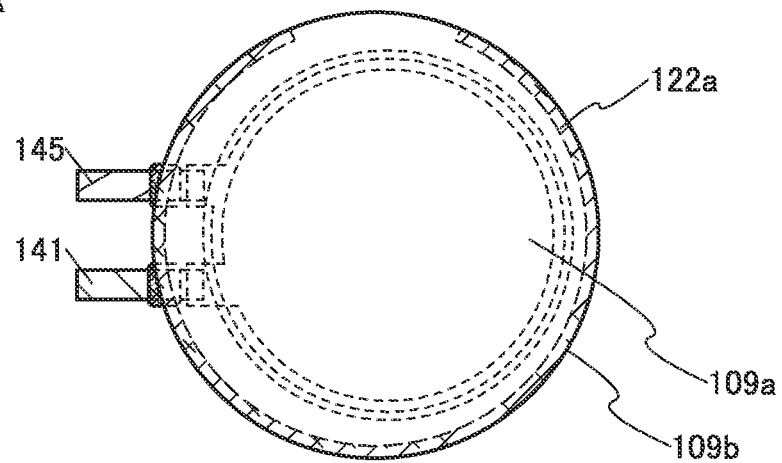
FIGS. 15A and 15B illustrate a method for manufacturing a power storage device of one embodiment of the present invention.

Next, the positive electrode 111, the positive electrode lead 141, the negative electrode 115, and the negative electrode lead 145 are sandwiched between the films 109a and 109b. Then, parts of the films 109a and 109b (a thermocompression-bonded region 122a in FIG. 15A) are bonded to each other (FIG. 15A). The bonding can be performed by thermal welding, for example. Note that the films 109a and 109b may have depressions and projections; however, in FIGS. 15A to 16C, the depressions and projections of the film 109a and the exterior body 110 are not illustrated for simplification.

[6. Bonding of Other Part of Exterior Body and Injection of Electrolyte Solution]

Figure 15B:
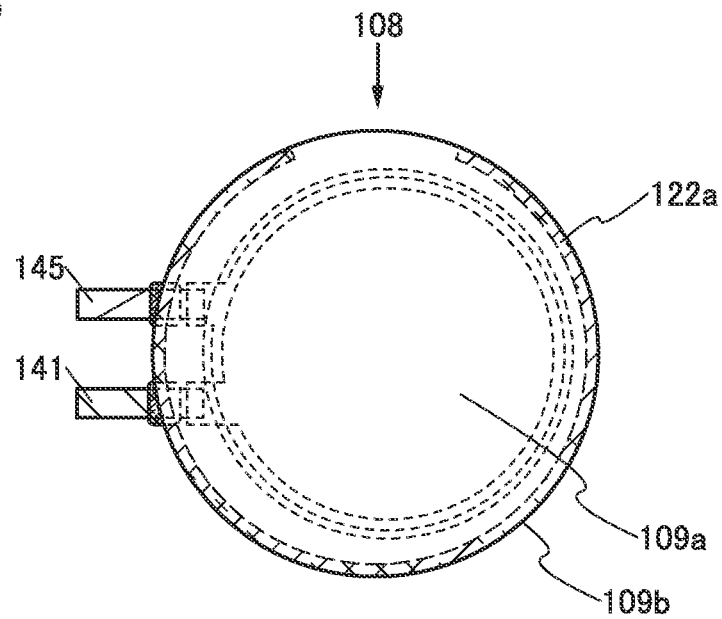

Then, the electrolyte solution 108 is injected to a region sandwiched between the films 109a and 109b from a portion where the films 109a and 109b are not bonded (FIG. 15B).

[7A. Sealing]

Figure 16A:
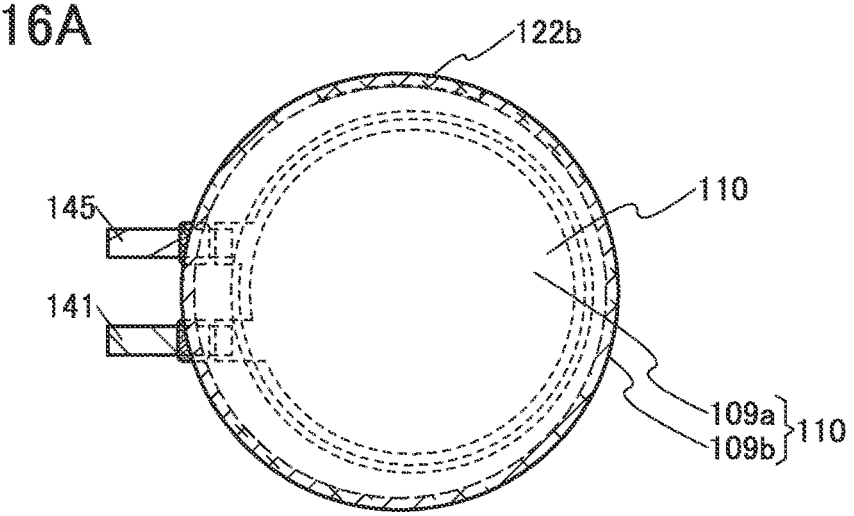
FIGS. 16A to 16C illustrate a method for manufacturing a power storage device of one embodiment of the present invention.

Next, the parts of the films 109a and 109b that are not yet bonded (a thermocompression-bonded region 122b in FIG. 16A) are bonded by heating and pressing under vacuum, thereby providing the bag-like exterior body 110 including the films 109a and 109b (FIG. 16A). This treatment is performed in an environment from which oxygen and water are eliminated, for example, in a glove box. The evacuation to a vacuum is preferably performed with a vacuum sealer, a liquid pouring sealer, or the like. An impulse sealer, a heat sealer, or the like can be used for the sealing. In the case of using an impulse sealer, for example, heating may be performed at a temperature of 175° C. and a degree of vacuum of 60 kPa for 3 seconds. In the case where a heat sealer is used and evacuation to a vacuum is not performed, heating may be performed at a temperature of 165° C. and a pressure of 0.3 MPa for 4 seconds. At this time, pressure may be applied to the positive electrode and the negative electrode from above the exterior body 110. The application of pressure enables removal of bubbles that enter between the positive electrode and the negative electrode when the electrolyte solution is injected.

[A. Aging]

Next, charging and discharging are preferably performed for aging treatment. In this specification and the like, the aging treatment refers to a step performed to detect an initial defect of a power storage device and to form a stable film on a negative electrode active material in initial charging and discharging. Specifically, the aging treatment refers to steps of keeping a charging state for a long time, performing one or more cycles of charging and discharging, or the like at a temperature close to the upper limit of the operating temperature range of the battery. Moreover, the aging treatment may include a step of releasing gas generated in a region covered with the exterior body 110.

When a stable film is formed on the negative electrode active material in initial charging and discharging, consumption of carrier ions caused by further film formation in subsequent charging and discharging can be inhibited. Thus, the aging treatment allows the performance of the power storage device to be more stabilized and a defective cell to be detected.

Figure 16B:
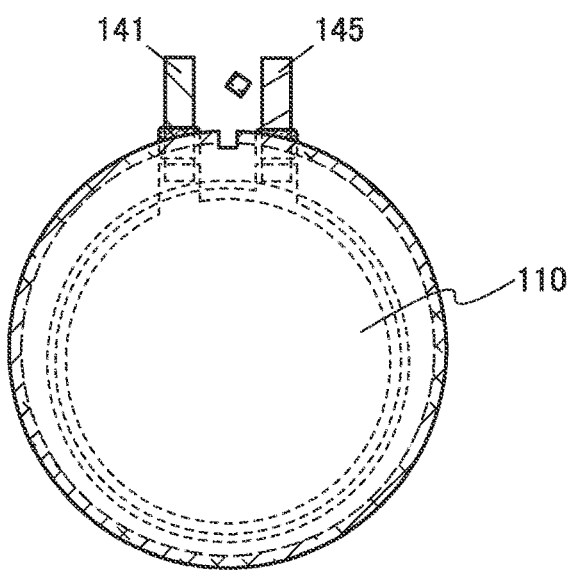

In this embodiment, after one or more cycles of charging and discharging, part of the exterior body 110 is cut out and gas is released as illustrated in FIG. 16B.

[9A. Resealing]

Figure 16C:
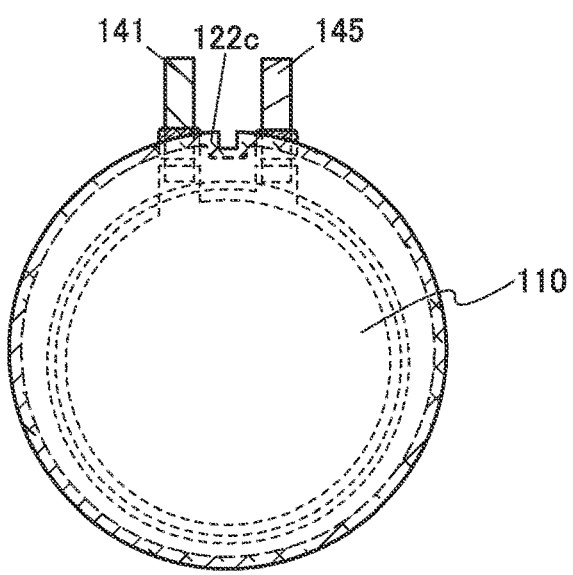

Then, a side of the exterior body 110 that has been cut out in the aging treatment (a thermocompression-bonded region 122c in FIG. 16C) is resealed (FIG. 16C). Through the above process, the power storage device 100 can be fabricated.

Described next is another method of sealing, aging, and resealing, which is performed after the bonding of the other part of the exterior body and injection of an electrolyte solution.

[7B. Sealing]

Figure 17A:
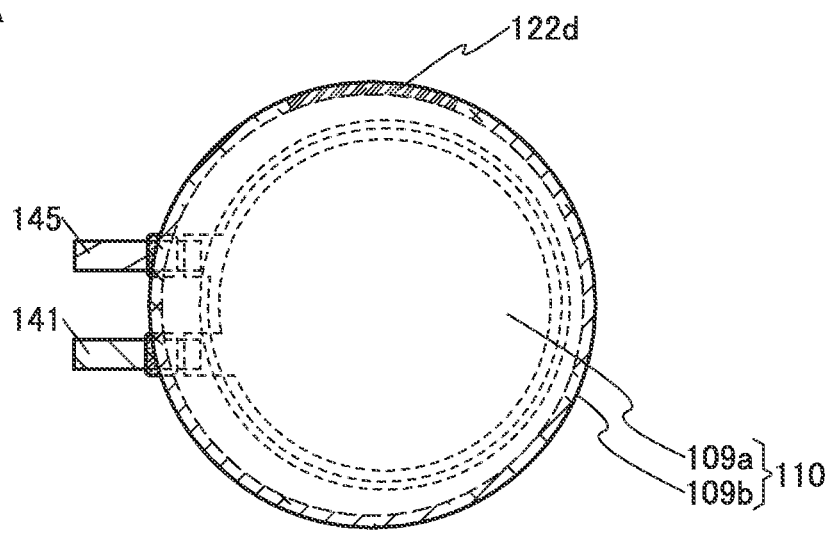
FIGS. 17A to 17C illustrate a method for manufacturing a power storage device of one embodiment of the present invention.

Next, the parts of the films 109a and 109b that are not yet bonded (a thermocompression-bonded region 122d in FIG. 17A) are bonded by heating and pressing under vacuum, thereby providing the bag-like exterior body 110 including the films 109a and 109b (FIG. 17A). At this time, the two films are bonded with a strength so low as to allow the films to be detached by external force. For example, the thermocompression-bonded region 122d is preferably formed by bonding the films at a temperature lower than that described in 7A. In the case of using an impulse sealer, for example, heating may be performed at a temperature of 130° C. to 140° C. and a degree of vacuum of 60 kPa for 3 seconds. In the case where a heat sealer is used and evacuation to a vacuum is not performed, heating may be performed at a temperature of 130° C. to 140° C. and a pressure of 0.3 MPa for 4 seconds.

[8B. Aging]

Then, aging is performed in a manner similar to that described in 8A.

Figure 17B:
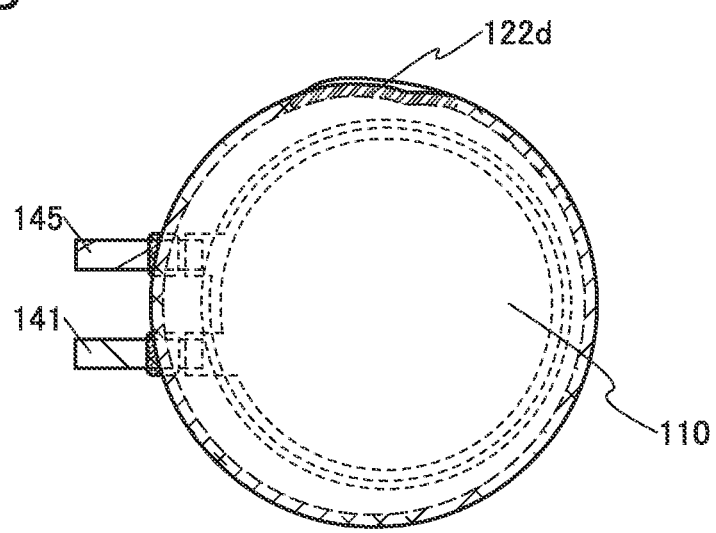

In this embodiment, as aging treatment, one or more cycles of charging and discharging are performed; then, as illustrated in FIG. 17B, the two films are detached from each other in the thermocompression-bonded region 122d by force so that gas is released.

[9B. Resealing]

Figure 17C:
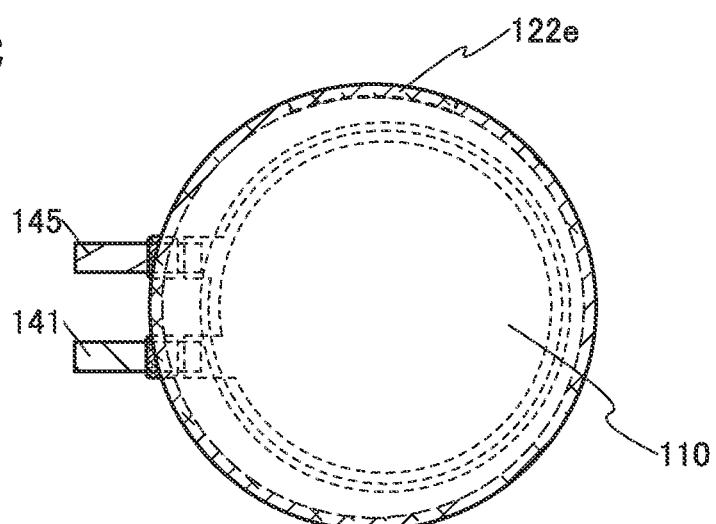

Next, the detached region is resealed (a thermocompression-bonded region 122e in FIG. 17C). This method enables the fabrication of the power storage device 100 including a thermocompression-bonded region with a circular inner periphery.

Another example of the method of stacking positive and negative electrodes described in [3. Stack of positive and negative electrodes] will be described with reference to FIGS. 18A to 20C.

Figure 18A:
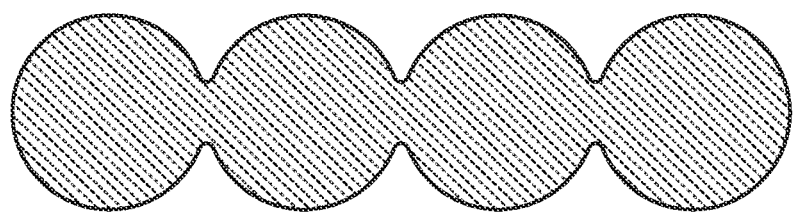
FIGS. 18A and 18B illustrate a method for manufacturing a power storage device of one embodiment of the present invention.
Figure 18B:
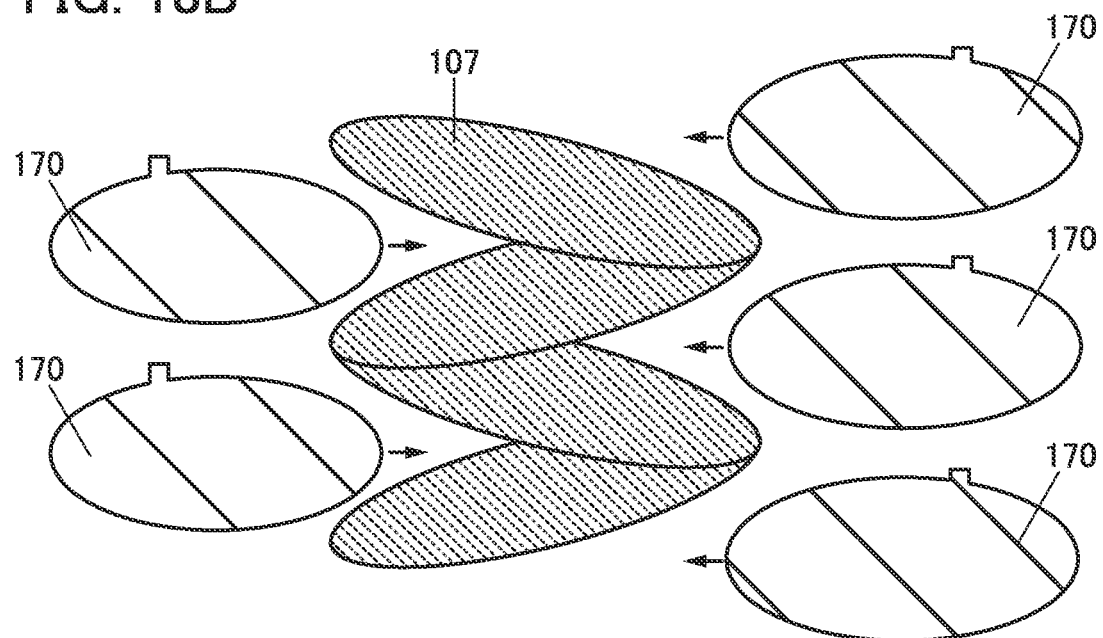

FIGS. 18A and 18B illustrate a method of stacking electrodes 170 with use of the separator 107 (see FIG. 18A) including a plurality of connected circles. As illustrated in FIG. 18B, the separator 107 is accordion-folded so that the electrodes 170 are positioned between folded sheets of the separator 107, whereby the electrodes 170 can be stacked.

Note that the electrode 170 refers to the positive electrode 111 or the negative electrode 115. For clarity of the drawings, the positive electrode 111 and the negative electrode 115 are denoted as the electrodes 170 in FIGS. 18A to 19C.

Figure 19A:
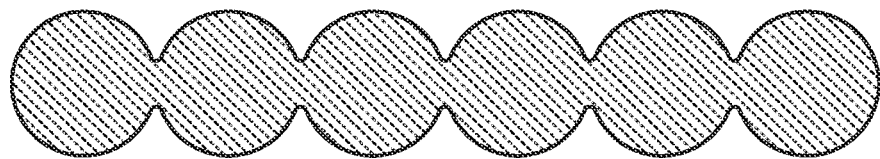
FIGS. 19A to 19C illustrate a method for manufacturing a power storage device of one embodiment of the present invention.
Figure 19B:
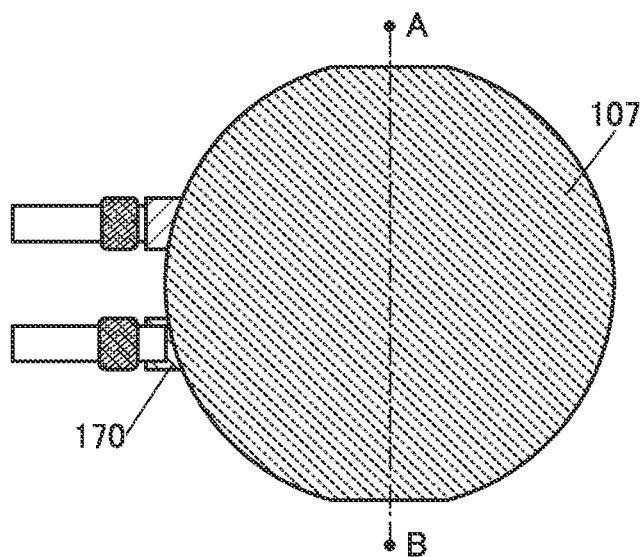
Figure 19C:
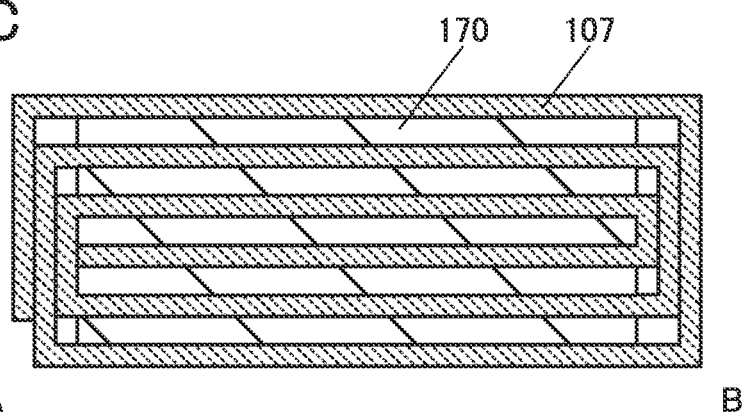

FIGS. 19A to 19C illustrate a method of stacking the electrodes 170 with use of the separator 107 (see FIG. 19A) including a plurality of connected circles to form a stack 175 (FIG. 19B). The stack 175 includes the electrodes 170, the separator 107, and lead electrodes. FIG. 19C is a cross-sectional view of the stack 175 along dashed dotted line AB in FIG. 19B. As illustrated in FIGS. 19A to 19C, the electrodes 170 can also be stacked by a method of winding the separator 107 including a plurality of connected circles so that the electrodes 170 are positioned between folded sheet of the separator 107.

Figure 20A:
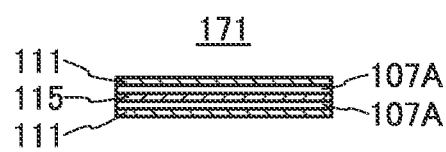
FIGS. 20A to 20C illustrate a method for manufacturing a power storage device of one embodiment of the present invention.
Figure 20B:
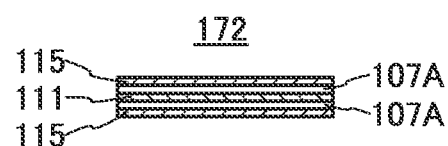
Figure 20C:
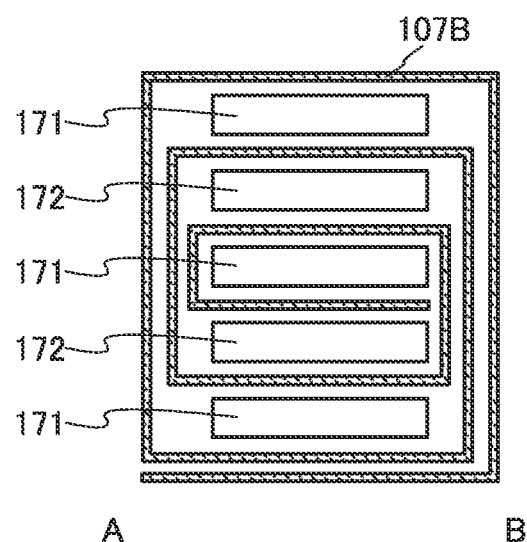

The stack 175 may be a combination of a plurality of stacks. The stack 175 illustrated in FIGS. 20A to 20C includes a plurality of first stacks 171 and a plurality of second stacks 172. FIGS. 20A and 20B are cross-sectional views of the first stack 171 and the second stack 172, respectively. FIG. 20C shows another example of the cross-sectional view of the stack 175 along dashed-dotted line AB in FIG. 19B. Note that for clarity of the drawings, FIG. 20C only illustrates the first stacks 171, the second stacks 172, and a separator 107B.

As illustrated in FIG. 20A, in the first stack 171, the positive electrode 111 including the positive electrode active material layer 102 in contact with each surface of the positive electrode current collector 101, a separator 107A, the negative electrode 115 including the negative electrode active material layer 106 in contact with each surface of the negative electrode current collector 105, the separator 107A, and the positive electrode 111 including the positive electrode active material layer 102 in contact with each surface of the positive electrode current collector 101 are stacked in this order. In the second stack 172, as illustrated in FIG. 20B, the negative electrode 115 including the negative electrode active material layer 106 in contact with each surface of the negative electrode current collector 105, the separator 107A, the positive electrode 111 including the positive electrode active material layer 102 in contact with each surface of the positive electrode current collector 101, the separator 107A, and the negative electrode 115 including the negative electrode active material layer 106 in contact with each surface of the negative electrode current collector 105 are stacked in this order.

As illustrated in FIG. 20C, the plurality of first stacks 171 and the plurality of second stacks 172 are covered with the winding separator 107B. In other words, the plurality of first stacks 171 and the plurality of second stacks 172 are positioned between winding sheet of the separator 107B.

Note that in the positive electrode 111 of the outermost first stack 171, the positive electrode active material layer 102 is preferably in contact with only a surface of the positive electrode current collector 101.

FIGS. 20A and 20B illustrate the structure in which each of the first stack and the second stack includes the three electrodes and the two separators; however, one embodiment of the present invention is not limited to this. Each stack may include four or more electrodes and three or more separators. A larger number of electrodes lead to higher capacity of the power storage device 100. Alternatively, each stack may include two electrodes and one separator. A smaller number of electrodes enable the power storage device to be curved more easily. FIG. 20C illustrates the structure in which the power storage device 100 includes the three first stacks 171 and the two second stacks 172; however, one embodiment of the present invention is not limited to this, and the number of the stacks may be increased. A larger number of stacks lead to higher capacity of the power storage device 100. Alternatively, the number of the stacks may be decreased. A smaller number of stacks enable the power storage device to be curved more easily.

Next, a method of making depressions and projections on a film used for the exterior body 110 will be described with reference to FIGS. 21A to 21F.

Figure 21A:
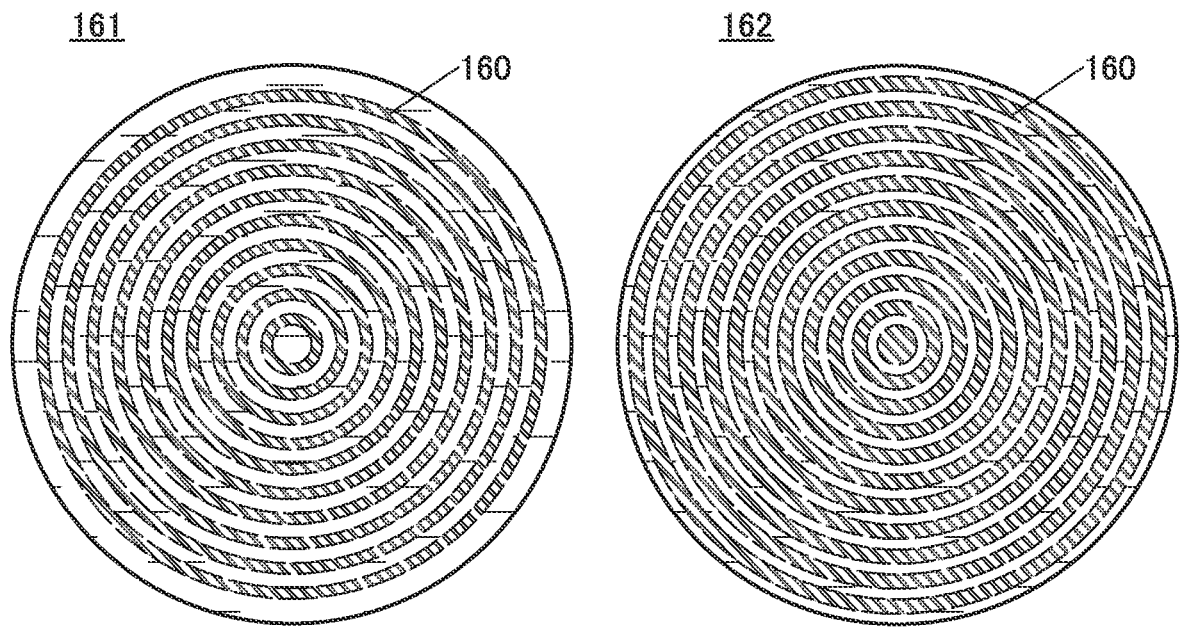
FIGS. 21A to 21F illustrate a method for manufacturing a power storage device of one embodiment of the present invention.
Figure 21B:
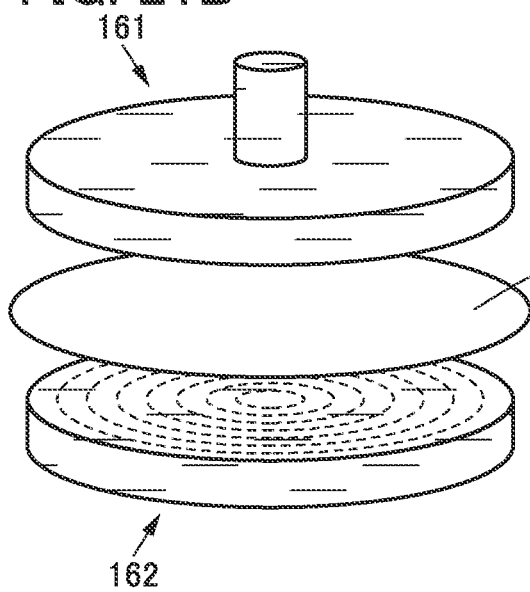
Figure 21C:
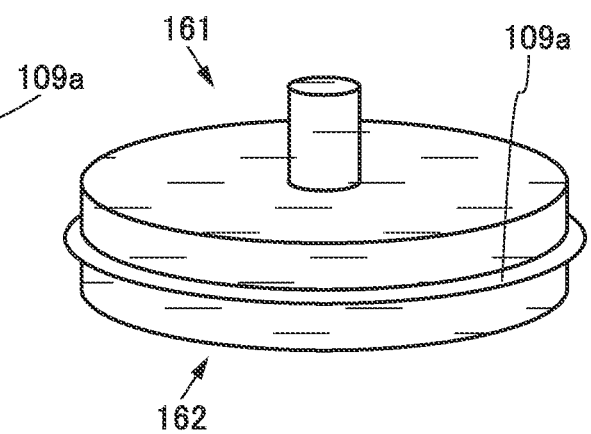

FIG. 21A illustrates a mold 161 and a mold 162, which are used for making depressions and projections on a film. The molds 161 and 162 each include a plurality of circular projections 160. When the film 109a is interposed between the molds 161 and 162 (see FIGS. 21B and 21C), circular depressions and projections can be made on the film 109a.

Figure 21D:
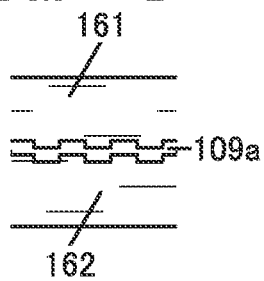
Figure 21E:
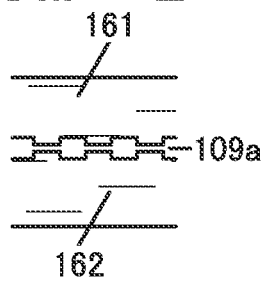
Figure 21F:
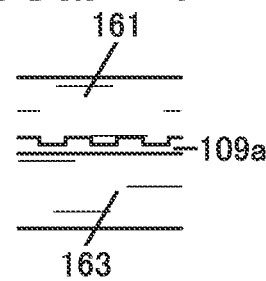

FIGS. 21D to 21F are cross-sectional views of the film interposed between the molds. The projections of the mold 161 and the projections of the mold 162 may be designed so as to engage with each other as illustrated in FIG. 21D. Alternatively, the projections of the mold 161 and the projections of the mold 162 may overlap with each other as illustrated in FIG. 21E. Further alternatively, the film 109a may be interposed between a flat plate 163 and the mold 161 as illustrated in FIG. 21F, so that depressions and projections can be made on the film 109a.

This embodiment can be implemented in appropriate combination with any of the other embodiments.

Embodiment 3

In this embodiment, materials that can be used in a power storage device of one embodiment of the present invention will be described in detail with reference to FIGS. 22A to 24B.

[1. Positive Electrode]

The positive electrode 111 includes the positive electrode current collector 101, the positive electrode active material layer 102 in contact with the positive electrode current collector 101, and the like.

The positive electrode current collector 101 can be formed using a material that has high conductivity and is not eluted with the potential of the positive electrode, such as a metal like stainless steel, gold, platinum, aluminum, or titanium, or an alloy thereof. Alternatively, an aluminum alloy to which an element that improves heat resistance, such as silicon, titanium, neodymium, scandium, or molybdenum, is added can be used. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The positive electrode current collector 101 can have a foil-like shape, a plate-like shape (a sheet-like shape), a net-like shape, a punching-metal shape, an expanded-metal shape, or the like as appropriate. The positive electrode current collector 101 preferably has a thickness greater than or equal to 5 μm and less than or equal to 30 μm. The surface of the positive electrode current collector 101 may be provided with an undercoat layer using graphite or the like.

The positive electrode active material layer 102 may further include, in addition to the positive electrode active material, a binder for increasing the adhesion of the positive electrode active material, a conductive additive for increasing the conductivity of the positive electrode active material layer 102, and the like.

Examples of the positive electrode active material that can be used for the positive electrode active material layer 102 include a composite oxide with an olivine crystal structure, a composite oxide with a layered rock-salt crystal structure, and a composite oxide with a spinel crystal structure. For example, a compound such as $LiFeO_2$, $LiCoO_2$, $LiNiO_2$, $LiMn_2O_4$, $V_2O_5$, $Cr_2O_5$, or $MnO_2$ can be used.

In particular, $LiCoO_2$ is preferable because it has high capacity and higher stability in the air and higher thermal stability than $LiNiO_2$, for example.

It is preferable to add a small amount of lithium nickel oxide ($LiNiO2$ or $LiNi_{1-x}M_xO_2$ (0<x<1) (M=Co, Al, or the like)) to a lithium-containing material with a spinel crystal structure which contains manganese such as $LiMn_2O_4$ because the characteristics of the power storage device using such a material can be improved.

In addition, a lithium-manganese composite oxide that is represented by the composition formula $Li_aMn_bM_cO_d$ can be used as the positive electrode active material. Here, the element M is preferably silicon, phosphorus, or a metal element other than lithium and manganese, and further preferably nickel. Furthermore, in the case where the whole particle of the lithium-manganese composite oxide is measured, it is preferable to satisfy the following at the time of discharging: $0<a/(b+c)<2$; $c>0$; and $0.26 \leq (b+c)/d<0.5$. Note that the composition ratio of the metal, silicon, phosphorus, or the like in the whole particle of the lithium-manganese composite oxide can be measured with an inductively coupled plasma mass spectrometer (ICP-MS), for example. The composition ratio of oxygen in the whole particle of the lithium-manganese composite oxide can be measured with an energy dispersive X-ray spectrometer (EDX), for example, or can be obtained using fusion gas analysis or valence evaluation of X-ray absorption fine structure (XAFS) analysis together with ICP-MS analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

To achieve high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6 \leq a \leq 1.848$; $0.19 \leq c/b \leq 0.935$; and $2.5 \leq d \leq 3$. Furthermore, it is particularly preferable to use a lithium-manganese composite oxide represented by the composition formula $Li_{1.68}Mn_{0.8062}Ni_{0.318}O_3$. In this specification and the like, a lithium-manganese composite oxide represented by the composition formula $Li_{1.68}Mn_{0.8062}Ni_{0.318}O_3$ refers to that formed at a ratio (molar ratio) of the amounts of raw materials of $Li_2CO_3$: $MnCO_3$: $NiO=0.84:0.8062:0.318$. Although this lithium-manganese composite oxide is represented by the composition formula $Li_{1.68}Mn_{0.8062}Ni_{0.318}O_3$, the composition might deviate from this.

Figure 22A:
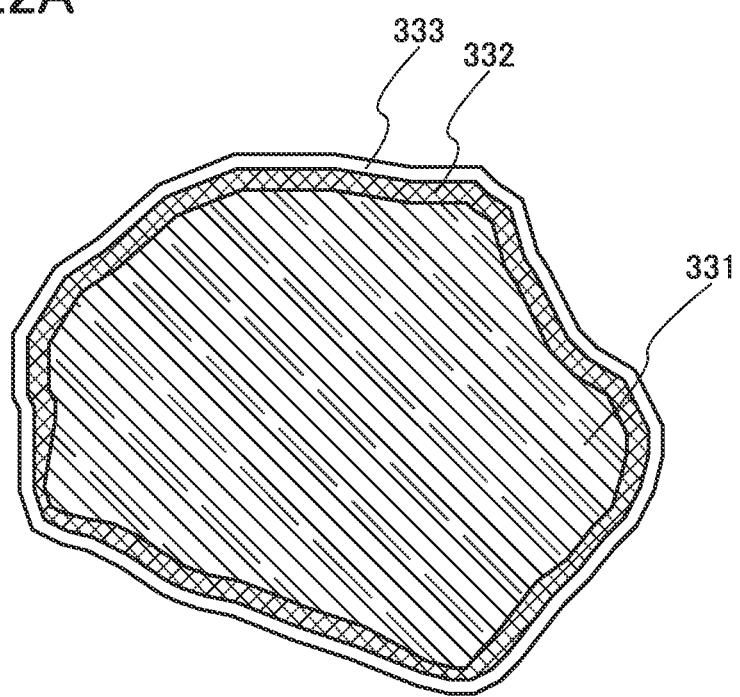
FIGS. 22A and 22B illustrate active materials that can be used for a power storage device.
Figure 22B:
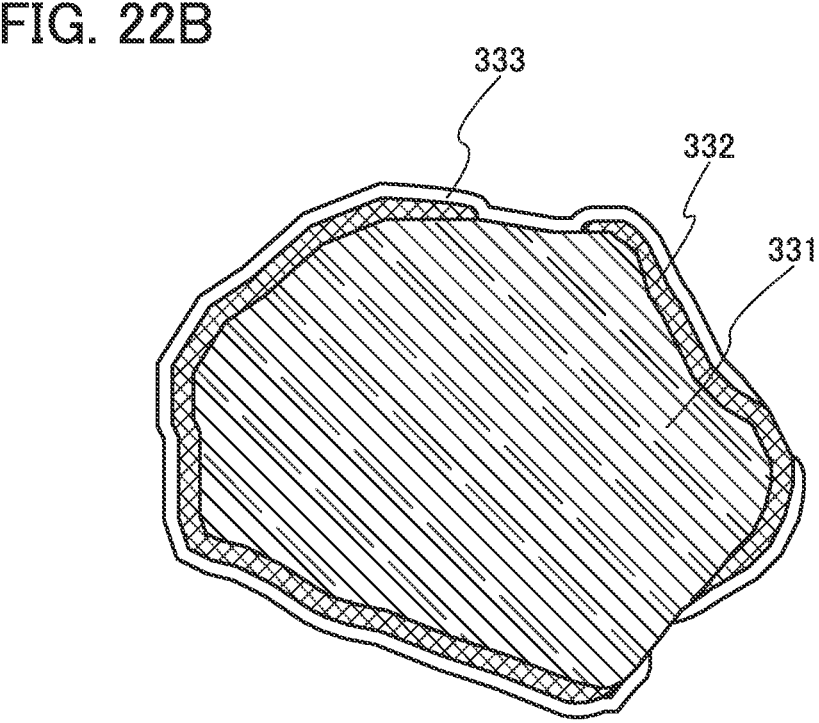

FIGS. 22A and 22B each illustrate an example of a cross section of a particle of the lithium-manganese composite oxide including regions which are different in crystal structure, crystal orientation, or oxygen content.

As illustrated in FIG. 22A, the lithium-manganese composite oxide preferably includes a first region 331, a second region 332, and a third region 333 as the regions which are different in crystal structure, crystal orientation, or oxygen content. The second region 332 is in contact with at least part of the outside of the first region 331. Here, the term "outside" refers to the side closer to a surface of a particle. The third region 333 preferably includes a region corresponding to the surface of the lithium-manganese composite oxide particle.

As shown in FIG. 22B, the first region 331 may include a region not covered with the second region 332. The second region 332 may include a region not covered with the third region 333. For example, the first region 331 may include a region in contact with the third region 333. The first region 331 may include a region covered with neither the second region 332 nor the third region 333.

The composition of the second region 332 is preferably different from that of the first region 331.

For example, description is made on the case where the composition of the first region 331 and that of the second region 332 are separately measured and the first region 331 and the second region 332 each contain lithium, manganese, the element M, and oxygen; the atomic ratio of lithium to manganese, the element M, and oxygen in the first region 331 is represented by $a1:b1:c1:d1$; and the atomic ratio of lithium to manganese, the element M, and oxygen in the second region 332 is represented by $a2:b2:c2:d2$. Note that the composition of each of the first region 331 and the second region 332 can be measured by, for example, energy dispersive X-ray spectroscopy (EDX) using a transmission electron microscope (TEM). In measurement by EDX, the ratio of lithium to the total composition is sometimes difficult to measure. Thus, a difference between the composition of the elements other than lithium in the first region 331 and that in the second region 332 is described below. Here, $d1/(b1+c1)$ is preferably greater than or equal to 2.2, more preferably greater than or equal to 2.3, and still more preferably greater than or equal to 2.35 and less than or equal to 3. Furthermore, $d2/(b2+c2)$ is preferably less than 2.2, more preferably less than 2.1, and still more preferably greater than or equal to 1.1 and less than or equal to 1.9. Also in this case, the composition of the whole particle of the lithium-manganese composite oxide including the first region 331 and the second region 332 preferably satisfies $0.26 \leq (b+c)/d<0.5$ as described above.

The valence of manganese in the second region 332 may be different from that of manganese in the first region 331. The valence of the element M in the second region 332 may be different from that of the element M in the first region 331.

Specifically, the first region 331 is preferably a lithium-manganese composite oxide having a layered rock-salt crystal structure. The second region 332 is preferably a lithium-manganese composite oxide having a spinel crystal structure.

Here, in the case where there is a spatial distribution of the composition or the valence of an element in any of the regions, the compositions or the valences in a plurality of portions in the region are obtained, and the average value thereof is calculated to be regarded as the composition or the valence in the region, for example.

A transition layer may be provided between the second region 332 and the first region 331. Here, the transition layer is a region where composition is changed continuously or gradually, a region where a crystal structure is changed continuously or gradually, or a region where the lattice constant of a crystal is changed continuously or gradually. A mixed layer may be provided between the second region 332 and the first region 331. The mixed layer is a region in which, for example, two or more crystals having different crystal orientations are mixed, two or more crystals having different crystal structures are mixed, or two or more crystals having different compositions are mixed.

For the third region 333, carbon or a metal compound can be used. Examples of the metal include cobalt, aluminum, nickel, iron, manganese, titanium, zinc, and lithium. An example of the metal compound include an oxide or a fluoride of the metal.

In particular, the third region 333 preferably contains carbon among the above. Since carbon has high conductivity, a particle coated with carbon in an electrode of the power storage device can reduce the resistance of the electrode, for example. When the third region 333 contains carbon, the second region 332 in contact with the third region 333 can be oxidized. The third region 333 may contain graphene, graphene oxide, or graphene oxide subjected to reduction. Graphene and reduced graphene oxide have excellent electrical characteristics of high conductivity and excellent physical properties of high flexibility and high mechanical strength. Moreover, the particle of the lithium-manganese composite oxide can be coated efficiently.

When the third region 333 contains carbon such as graphene, the power storage device using the lithium-manganese composite oxide for its positive electrode material can have improved cycle characteristics.

The thickness of a layer containing carbon is preferably greater than or equal to 0.4 nm and less than or equal to 40 nm.

Furthermore, the average diameter of primary particles of the lithium-manganese composite oxide is preferably greater than or equal to 5 nm and less than or equal to 50 μm, more preferably greater than or equal to 100 nm and less than or equal to 500 nm, for example. Furthermore, the specific surface area is preferably greater than or equal to 5 m$^2$/g and less than or equal to 15 m$^2$/g. Furthermore, the average diameter of secondary particles is preferably greater than or equal to 5 μm and less than or equal to 50 μm. Note that the average particle diameters can be measured with a particle size distribution analyzer or the like using a laser diffraction and scattering method or by observation with a scanning electron microscope (SEM) or a TEM. The specific surface area can be measured by a gas adsorption method.

Alternatively, a complex material (LiMPO$_4$ (general formula) (M is one or more of Fe(II), Mn(II), Co(II), and Ni(II))) can be used as the positive electrode active material. Typical examples of the general formula LiMPO$_4$ include lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

LiFePO$_4$ is particularly preferable because it properly has properties necessary for the positive electrode active material, such as safety, stability, high capacity density, and the existence of lithium ions that can be extracted in initial oxidation (charging).

Alternatively, a complex material such as Li$_{(2-j)}$MSiO$_4$ (general formula) (M is one or more of Fe(II), Mn(II), Co(II), and Ni(II); 0≤j≤2) can be used as the positive electrode active material. Typical examples of Li$_{(2-j)}$MSiO$_4$ (general formula) include lithium compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Mo$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a NASICON compound represented by a general formula, A$_x$M$_2$(XO$_4$)$_3$ (A=Li, Na, or Mg, M=Fe, Mn, Ti, V, or Nb, and X=S, P, Mo, W, As, or Si), can be used as the positive electrode active material. Examples of the NASICON compound include Fe$_2$(MnO$_4$)$_3$, Fe$_2$(SO$_4$)$_3$, and Li$_3$Fe$_2$(PO$_4$)$_3$. Still further alternatively, a compound represented by a general formula, Li$_2$MPO$_4$F, Li$_2$MP$_2$O$_7$, or Li$_5$MO$_4$ (M=Fe or Mn), a perovskite fluoride such as NaFeF$_3$ or FeF$_3$, a metal chalcogenide (a sulfide, a selenide, or a telluride) such as TiS$_2$ or MoS$_2$, an oxide with an inverse spinel crystal structure such as LiMVO$_4$, a vanadium oxide (e.g., V$_2$O$_5$, V$_6$O$_{13}$, or LiV$_3$O$_8$), a manganese oxide, or an organic sulfur compound can be used as the positive electrode active material, for example.

In the case where carrier ions are alkali metal ions other than lithium ions or alkaline-earth metal ions, the positive electrode active material may contain, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as NaFeO$_2$ or Na$_{2/3}$[Fe$_{1/2}$Mn$_{1/2}$]O$_2$.

Note that although not shown, a conductive material such as a carbon layer may be provided on a surface of the positive electrode active material layer 102. With the conductive material such as the carbon layer, the conductivity of the electrode can be increased. For example, the positive electrode active material layer 102 can be coated with the carbon layer by mixing a carbohydrate such as glucose at the time of baking the positive electrode active material.

The average particle diameter of the primary particle of the positive electrode active material is preferably greater than or equal to 50 nm and less than or equal to 100 μm.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electrical conduction can be formed in the electrode by the conductive additive. The conductive additive also allows maintaining of a path for electric conduction between the particles of the positive electrode active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase the contact points and contact area of active materials.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by XPS is higher than or equal to 2 atomic % and lower than or equal to 11 atomic %, preferably higher than or equal to 3 atomic % and lower than or equal to 10 atomic %.

Graphene is capable of making low-resistance surface contact and has extremely high conductivity even with a small thickness. Therefore, even a small amount of graphene can efficiently form a conductive path in an active material layer.

In the case where an active material with a small average particle diameter (e.g., 1 μm or less) is used, the specific surface area of the active material is large and thus more conductive paths for the active material particles are needed. In such a case, it is particularly preferable to use graphene, which has extremely high conductivity and can efficiently form a conductive path even in a small amount.

A cross-sectional structure example of a positive electrode active material layer containing graphene as a conductive additive is described below. Note that a negative electrode active material layer may contain graphene as a conductive additive.

Figure 23A:
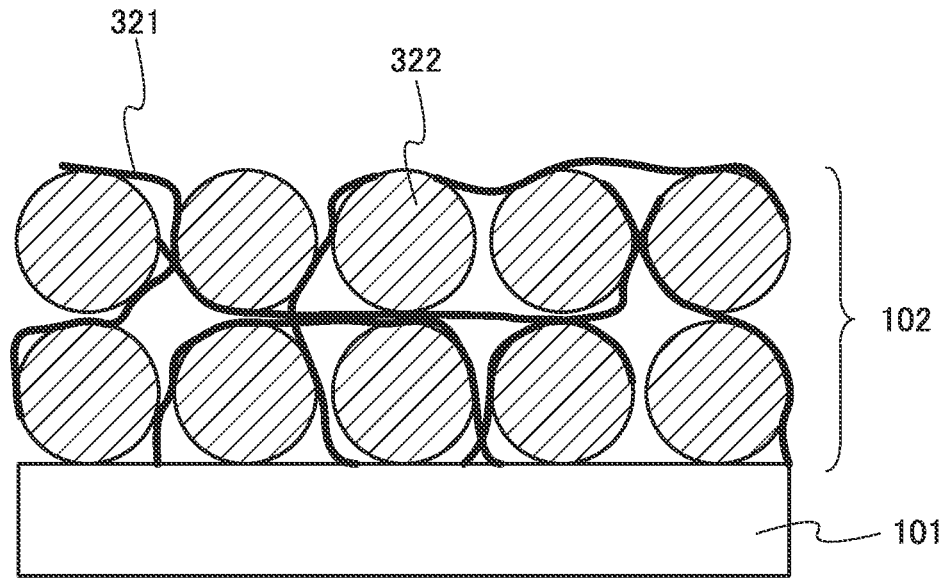

FIG. 23A is a longitudinal sectional view of the positive electrode active material layer 102 and the positive electrode current collector 101. The positive electrode active material layer 102 includes positive electrode active material particles 322, graphene flakes 321 as a conductive additive, and a binder (not illustrated).

In the longitudinal section of the positive electrode active material layer 102, as illustrated in FIG. 23A, the sheet-like graphene flakes 321 in the positive electrode active material layer 102 substantially uniformly cover the positive electrode active materials such that surface contact is made. The graphene flakes 321 are schematically shown by thick lines in FIG. 23A but are actually thin films each having a thickness corresponding to the thickness of a single layer or a multi-layer of carbon molecules. The plurality of graphene flakes 321 are formed in such a way as to wrap or cover the plurality of positive electrode active material particles 322, or adhere to the surfaces of the plurality of positive electrode active material particles 322, so that the graphene flakes 321 make surface contact with the positive electrode active material particles 322. Furthermore, the graphene flakes 321 are also in surface contact with each other; consequently, the plurality of graphene flakes 321 form a three-dimensional network for electric conduction.

This is because graphene oxide with extremely high dispersibility in a polar solvent is used for the formation of the graphene flakes 321. The solvent is removed by volatilization from a dispersion medium in which graphene oxide is uniformly dispersed, and the graphene oxide is reduced to graphene; hence, the graphene flakes 321 remaining in the positive electrode active material layer 102 partly overlap with each other and cover the positive electrode active material such that surface contact is made, thereby forming an electrical conduction path. Note that, graphene oxide may be reduced by, for example, heat treatment or with the use of a reducing agent.

Unlike conductive additive particles that make point contact with an active material, such as acetylene black, the graphene flake 321 is capable of making low-resistance surface contact; accordingly, the electrical conduction between the positive electrode active material particles 322 and the graphene flakes 321 can be improved without an increase in the amount of a conductive additive. Thus, the proportion of the positive electrode active material particles 322 in the positive electrode active material layer 102 can be increased. Accordingly, the discharge capacity of a power storage device can be increased.

In addition, graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the power storage device can be increased.

The aforementioned structure where the positive electrode active material layer or the negative electrode active material layer contains graphene as a conductive additive is particularly effective for a flexible power storage device.

Figure 24A:
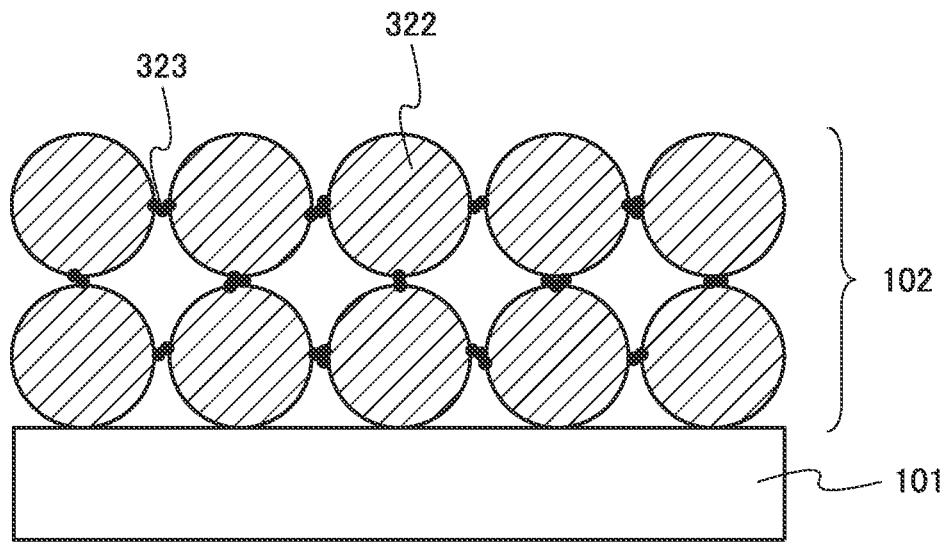

FIG. 24A is a longitudinal sectional view of the positive electrode active material layer 102 and the positive electrode current collector 101 of a conventional example in which conductive additive particles 323 such as acetylene black are used.

The positive electrode active material particles 322 are in contact with the conductive additive particles 323, so that a network for electrical conduction is formed between the positive electrode active material particles 322.

Figure 24B:
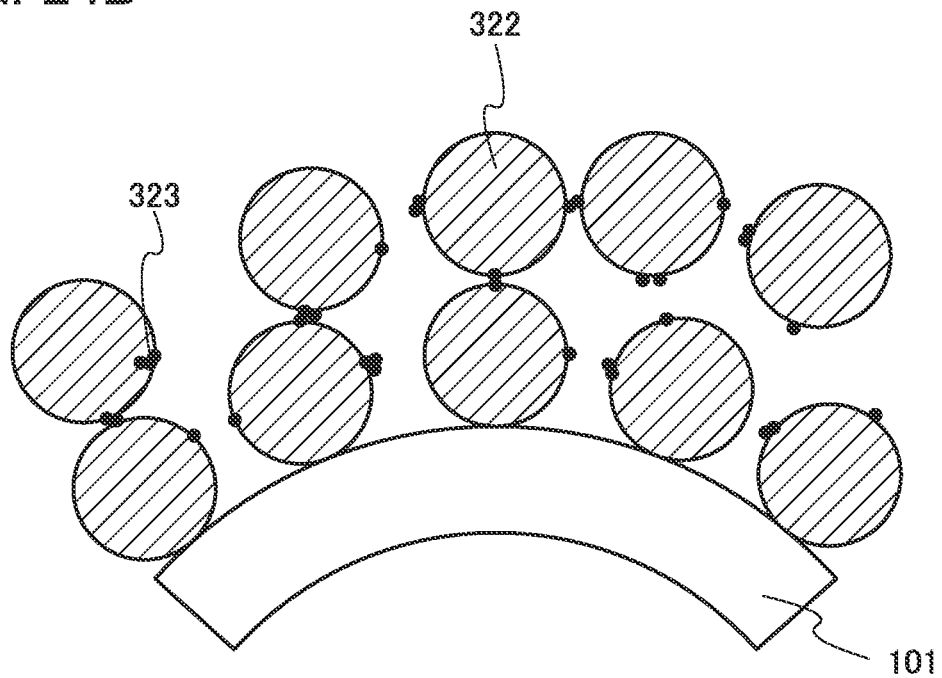

FIG. 24B shows the case where the positive electrode active material layer 102 and the positive electrode current collector 101 in FIG. 24A are curved. As illustrated in FIG. 24B, when the conductive additive particles 323 are used as a conductive additive, the distance between the positive electrode active material particles 322 changes with curving of the positive electrode active material layer 102, which might break part of the network for electrical conduction between the positive electrode active material particles 322.

Figure 23B:
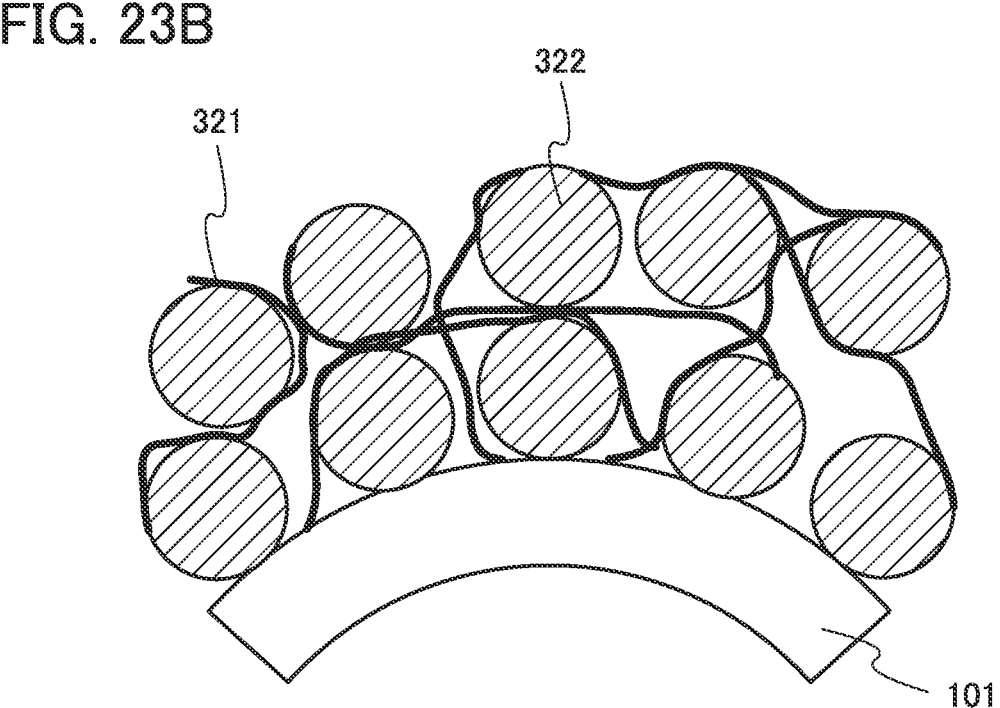

FIG. 23B shows the case where the positive electrode active material layer 102 containing graphene as a conductive additive, and the positive electrode current collector 101 in FIG. 23A are curved. Since graphene is a flexible sheet, the network for electrical conduction can be maintained even when the distance between the positive electrode active material particles 322 changes with curving of the positive electrode active material layer 102 as in FIG. 23B.

Electrodes used for the power storage device of one embodiment of the present invention can be fabricated by various methods. For example, in the case where an active material layer is formed over a current collector by a coating method, the active material, the binder, the conductive additive, and the dispersion medium (also referred to as a solvent) are mixed to form a paste, the paste is applied to the current collector, and the dispersion medium is vaporized. After that, the active material layer may be pressed by a compression method such as a roll press method or a flat plate press method so as to be consolidated if necessary.

As the dispersion medium, water, polar organic solvent such as N-methylpyrrolidone (NMP) or dimethylformamide, or the like can be used. Water is preferably used in terms of the safety and cost.

It is preferable for the binder to include, for example, water-soluble polymers. As the water-soluble polymers, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is more preferably used in combination with the aforementioned water-soluble polymers.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), polyacrylonitrile (PAN), polyvinyl chloride, ethylene-propylene-diene polymer, polyvinyl acetate, or nitrocellulose is preferably used.

Two or more of the above materials may be used in combination for the binder.

The content of the binder in the positive electrode active material layer 102 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 102 is preferably greater than or equal to 1 wt % and less than or equal to 10 wt %, more preferably greater than or equal to 1 wt % and less than or equal to 5 wt %.

In the case where the positive electrode active material layer 102 is formed by a coating method, the positive electrode active material, the binder, and the conductive additive are mixed to form a positive electrode paste (slurry), and the positive electrode paste is applied to the positive electrode current collector 101 and dried.

[2. Negative Electrode]

The negative electrode 115 includes, for example, the negative electrode current collector 105 and the negative electrode active material layer 106 formed over the negative electrode current collector 105.

The negative electrode current collector 105 can be formed using a material that has high conductivity and is not alloyed with a carrier ion of lithium or the like, such as stainless steel, gold, platinum, iron, copper, or titanium, or an alloy thereof. Alternatively, an aluminum alloy to which an element that improves heat resistance, such as silicon, titanium, neodymium, scandium, or molybdenum, is added can be used. The negative electrode current collector 105 can have a foil-like shape, a plate-like shape (sheet-like shape), a net-like shape, a punching-metal shape, an expanded-metal shape, or the like as appropriate. The negative electrode current collector 105 preferably has a thickness greater than or equal to 5 μm and less than or equal to 30 μm. The surface of the negative electrode current collector 105 may be provided with an undercoat layer using graphite or the like.

The negative electrode current collector is preferably formed using a high-strength material such as stainless steel or titanium because the negative electrode current collector can resist the change in the shape caused by expansion of the negative electrode active material layer. The use of this material is particularly preferable in the case where the negative electrode active material is a material whose volume largely changes with charging and discharging, such as a material containing silicon.

The negative electrode active material layer 106 may further include a binder for increasing the adhesion of negative electrode active materials, a conductive additive for increasing the conductivity of the negative electrode active material layer 106, and the like in addition to the negative electrode active materials. For the materials of the binder and the conductive additive which are used for the negative electrode active material layer, the materials of the binder and the conductive additive which are used for the positive electrode active material layer can be referred to.

A material with which lithium can be dissolved and precipitated or a material which can reversibly react with lithium ions can be used for a negative electrode active material; for example, a lithium metal, a carbon-based material, or an alloy-based material can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion power storage device can have a high operating voltage. In addition, graphite is preferable because of its advantages such as relatively high capacity per unit volume, small volume expansion, low cost, and safety greater than that of a lithium metal.

As the negative electrode active material, other than the above carbon materials, a material which enables charge-discharge reaction by an alloying reaction and a dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, etc. can be used. Such elements have higher capacity than carbon. In particular, silicon has a significantly high theoretical capacity of 4200 mAh/g; thus, silicon is preferably used for the negative electrode active material. Examples of the material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Note that SiO refers to the powder of a silicon oxide and can also be referred to as $SiO_y$ (2>y>0). SiO may include a silicon-rich portion. Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystalline silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a power storage device is fabricated using SiO as a material thereof and SiO is oxidized because of repeated charge and discharge cycles, SiO is changed into $SiO_2$ in some cases.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the negative electrode active material layer 106 is formed by a coating method, the negative electrode active material and the binder are mixed to form a negative electrode paste (slurry), and the negative electrode paste is applied to the negative electrode current collector 105 and dried.

Graphene may be formed on a surface of the negative electrode active material layer 106. In the case of using silicon as the negative electrode active material, the volume of silicon greatly changes due to occlusion and release of carrier ions in charge-discharge cycles. Therefore, the adhesion between the negative electrode current collector 105 and the negative electrode active material layer 106 is decreased, resulting in degradation of battery characteristics caused by charge and discharge. Thus, graphene is preferably formed on a surface of the negative electrode active material layer 106 containing silicon because even when the volume of silicon changes in charge-discharge cycles, decrease in the adhesion between the negative electrode current collector 105 and the negative electrode active material layer 106 can be inhibited, which makes it possible to reduce degradation of battery characteristics.

Alternatively, a coating film of an oxide or the like may be formed on the surface of the negative electrode active material layer 106. A coating film formed by decomposition or the like of an electrolytic solution or the like in charging cannot release electric charges used at the formation, and therefore forms irreversible capacity. In contrast, the film of an oxide or the like provided on the surface of the negative electrode active material layer 106 in advance can reduce or prevent generation of irreversible capacity.

As the coating film coating the negative electrode active material layer 106, an oxide film of any one of niobium, titanium, vanadium, tantalum, tungsten, zirconium, molybdenum, hafnium, chromium, aluminum, and silicon or an oxide film containing any one of these elements and lithium can be used. Such a film is much denser than a conventional film formed on a surface of a negative electrode due to a decomposition product of an electrolytic solution.

For example, niobium oxide ($Nb_2O_5$) has a low electric conductivity of $10^{-9}$ S/cm and a high insulating property. For this reason, a niobium oxide film inhibits an electrochemical decomposition reaction between the negative electrode active material and the electrolytic solution. On the other hand, niobium oxide has a lithium diffusion coefficient of $10^{-9}$ $cm^2$/sec and high lithium ion conductivity. Therefore, niobium oxide can transmit lithium ions. Alternatively, silicon oxide or aluminum oxide may be used.

A sol-gel method can be used to coat the negative electrode active material layer 106 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. Therefore, by adding a negative electrode active material such as graphite to a raw material of the metal oxide film which is a solvent, the active material can be easily dispersed into the gel. In such a manner, the coating film can be formed on the surface of the negative electrode active material layer 106. A decrease in the capacity of the power storage device can be prevented by using the coating film.

[3. Separator]

As a material for the separator 107, a porous insulator such as cellulose, polypropylene (PP), polyethylene (PE), polybutene, nylon, polyester, polysulfone, polyacrylonitrile, polyvinylidene fluoride, tetrafluoroethylene, or polyphenylene sulfide can be used. Alternatively, nonwoven fabric of a glass fiber or the like, or a diaphragm in which a glass fiber and a polymer fiber are mixed may be used. Alternatively, to increase heat resistance, a polyester nonwoven fabric to which ceramic is applied or which is coated with aramid may be used as a separator.

[4. Electrolyte Solution]

As a solvent for the electrolyte solution 108 used in the power storage device 100, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more kinds of ionic liquids (room temperature molten salts) that have non-flammability and non-volatility as the solvent for the electrolyte solution can prevent the power storage device from exploding or catching fire even when the power storage device internally shorts out or the internal temperature increases due to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(FSO_2)_2$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

Polymer may be added to the electrolyte solution so that the electrolyte solution becomes gelled. The electrolyte solution being gelled has higher safety against liquid leakage or the like. Furthermore, a power storage device can be thinner and more lightweight. As the polymer capable of making the electrolyte solution gelled, a polyalkylene oxide-based polymer, a polyacrylonitrile-based polymer, a polyvinylidene fluoride-based polymer, a polyacrylate-based polymer, or a polymethacrylate-based polymer can be used. Note that in this specification and the like, the polyvinylidene fluoride-based polymer, for example, refers to a polymer containing polyvinylidene fluoride, and includes a poly(vinylidene fluoride-hexafluoropropylene) copolymer and the like in its category. The formed polymer may be porous.

The above polymer can be qualitatively analyzed using a Fourier transform infrared (FT-IR) spectrometer or the like. For example, the polyvinylidene fluoride-based polymer has an absorption peak showing a C—F bond in a spectrum obtained by the FT-IR spectrometer. The polyacrylonitrile-based polymer has an absorption peak showing a C≡N bond in a spectrum obtained by the FT-IR spectrometer.

The electrolyte solution used for the power storage device is preferably a highly purified one so as to contain a negligible amount of dust particles and elements other than the constituent elements of the electrolyte solution (hereinafter, also simply referred to as impurities). Specifically, the weight ratio of impurities to the electrolyte solution is less than or equal to 1%, preferably less than or equal to 0.1%, and more preferably less than or equal to 0.01%. An additive agent such as vinylene carbonate may be added to the electrolyte solution.

Instead of the electrolyte solution, a solid electrolyte including an inorganic material such as a sulfide-based inorganic material or an oxide-based inorganic material can be used. When the solid electrolyte is used, a separator and a spacer are not necessary. Furthermore, the battery can be entirely solidified; therefore, there is no danger of liquid leakage, dramatically improving the safety of the battery.

This embodiment can be implemented in appropriate combination with any of the other embodiments.

Embodiment 4

Described in this embodiment are examples of an electronic device including the power storage device shown in Embodiment 1.

Figure 25:
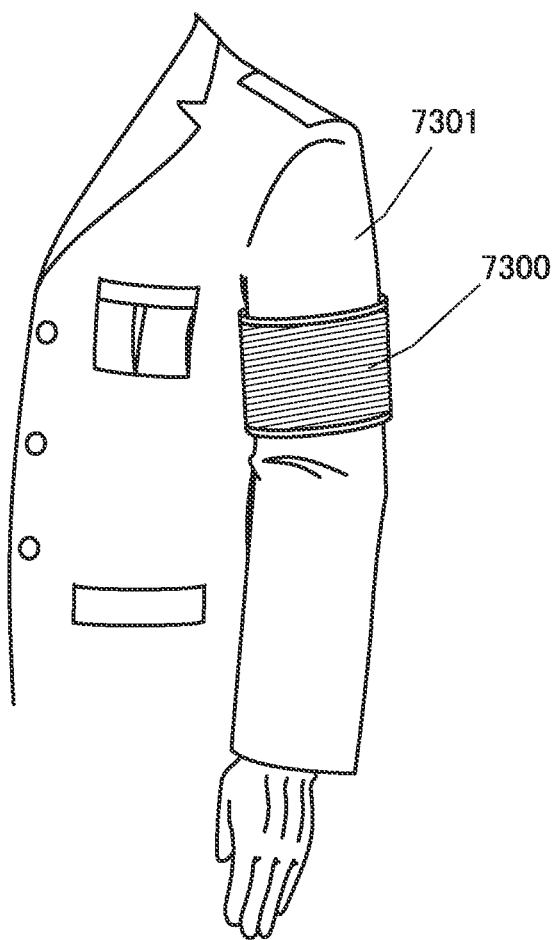
FIG. 25 illustrates an electronic device of one embodiment of the present invention.

FIG. 25 illustrates an example of an armband electronic device including a flexible power storage device. An armband device 7300 illustrated in FIG. 25 can be worn on an arm 7301 and includes a display portion having a curved surface and a bendable power storage device.

Note that in the display portion, a display element, a display device which is a device including a display element, a light-emitting element, and a light-emitting device which is a device including a light-emitting element can employ a variety of modes or can include a variety of elements. The display element, the display device, the light-emitting element, or the light-emitting device includes at least one of an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. In addition to that, the display element, the display device, the light-emitting element, or the light-emitting device may include a display medium whose contrast, luminance, reflectivity, transmittance, or the like is changed by electrical or magnetic effect. Examples of a display device having an EL element include an EL display. Examples of display devices having electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multi-layer film in which a plurality of layers are stacked. When graphene or graphite is provided in this manner, a nitride semiconductor, for example, an n-type GaN semiconductor layer including crystals can be easily formed thereover. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

Preferably, the armband device 7300 further includes one or more functional elements, e.g., a sensor. Examples of the sensor include a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. The armband device 7300 may include a functional element such as a touch panel, an antenna, a power generation element, or a speaker.

For example, when a user wears the armband device 7300 on his or her arm and makes its display emit light at nighttime, traffic safety can be ensured. For another example, when a construction crew or the like who wears a helmet wears the armband device 7300 and operates it, he or she can exchange information by communication to easily obtain the positional information of other crews so that he or she can work safely.

FIGS. 26A to 26F illustrate other examples of the electronic device including a flexible power storage device. Examples of electronic devices each including a flexible power storage device include television devices (also referred to as televisions or television receivers), monitors of computers or the like, cameras such as digital cameras and digital video cameras, digital photo frames, cellular phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 26A:
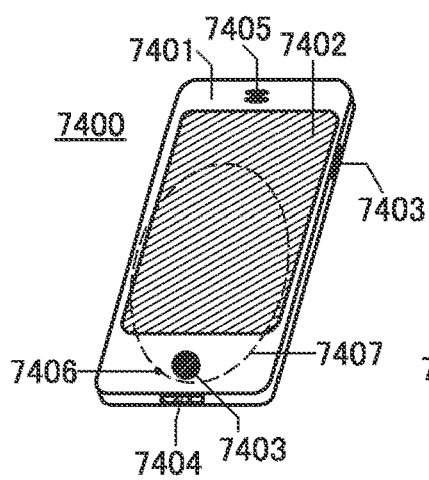
FIGS. 26A to 26F illustrate electronic devices of one embodiment of the present invention.

FIG. 26A illustrates an example of a cellular phone. A cellular phone 7400 includes a display portion 7402 incorporated in a housing 7401, operation buttons 7403, an external connection port 7404, a speaker 7405, a microphone 7406, and the like. Note that the cellular phone 7400 includes a power storage device 7407.

Figure 26B:
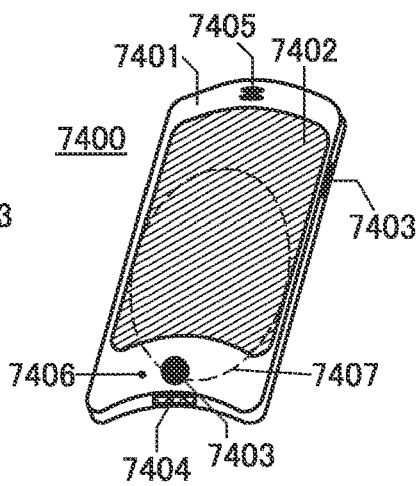
Figure 26C:
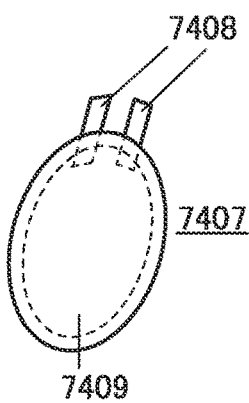

FIG. 26B illustrates the cellular phone 7400 that is bent. When the whole cellular phone 7400 is bent by external force, the power storage device 7407 included in the cellular phone 7400 is also bent. FIG. 26C illustrates the bent power storage device 7407. The power storage device 7407 is a thin power storage device. The power storage device 7407 is fixed while being bent. Note that the power storage device 7407 includes a lead electrode 7408 electrically connected to a current collector 7409. The current collector 7409 is, for example, copper foil, and partly alloyed with gallium so as to improve the adhesion between the current collector 7409 and an active material layer in contact with the current collector 7409. Consequently, the power storage device 7407 can have high reliability even in a state of being bent.

Figure 26D:
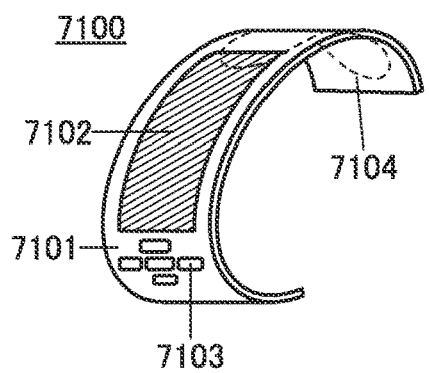
Figure 26E:
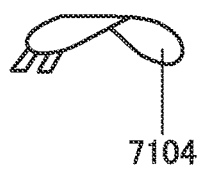
Figure 26F:
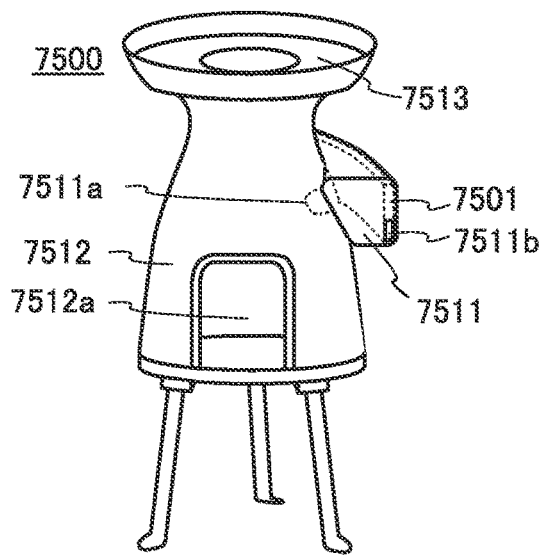

FIG. 26D illustrates an example of a bangle display device. A portable display device 7100 includes a housing 7101, a display portion 7102, operation buttons 7103, and a power storage device 7104. FIG. 26E illustrates the bent power storage device 7104. When the display device is worn on a user's arm while the power storage device 7104 is bent, the shape of the housing changes to change the curvature of part or the whole of the power storage device 7104. Note that the radius of curvature of a curve at a point refers to the radius of the circular arc that best approximates the curve at that point. The reciprocal of the radius of curvature is curvature. Specifically, part or the whole of the housing or the main surface of the power storage device 7104 is changed in the range of radius of curvature from 40 mm to 150 mm. When the radius of curvature at the main surface of the power storage device 7104 is 40 mm to 150 mm, the reliability can be kept high.

Furthermore, the flexile power storage device which can be bent by external force can be provided with high space efficiency in any of a variety of electronic devices. For example, in a stove 7500 illustrated in FIG. 26F, a module 7511 is attached to a main body 7512. The module 7511 includes a power storage device 7501, a motor, a fan, an air outlet 7511a, and a thermoelectric generation device. In the stove 7500, after a fuel is injected through an opening 7512a and ignited, outside air can be sent through the air outlet 7511a to the inside of the stove 7500 by rotating the motor and the fan which are included in the module 7511 using power of the power storage device 7501. In this manner, the stove 7500 can have strong heating power because outside air can be taken into the inside of the stove 7500 efficiently. In addition, cooking can be performed on an upper grill 7513 with thermal energy generated by the combustion of fuel. When the thermal energy is converted into power with the thermoelectric generation device of the module 7511, the power storage device 7501 can be charged with the power. The power charged into the power storage device 7501 can be output through an external terminal 7511b.

Figure 27A:
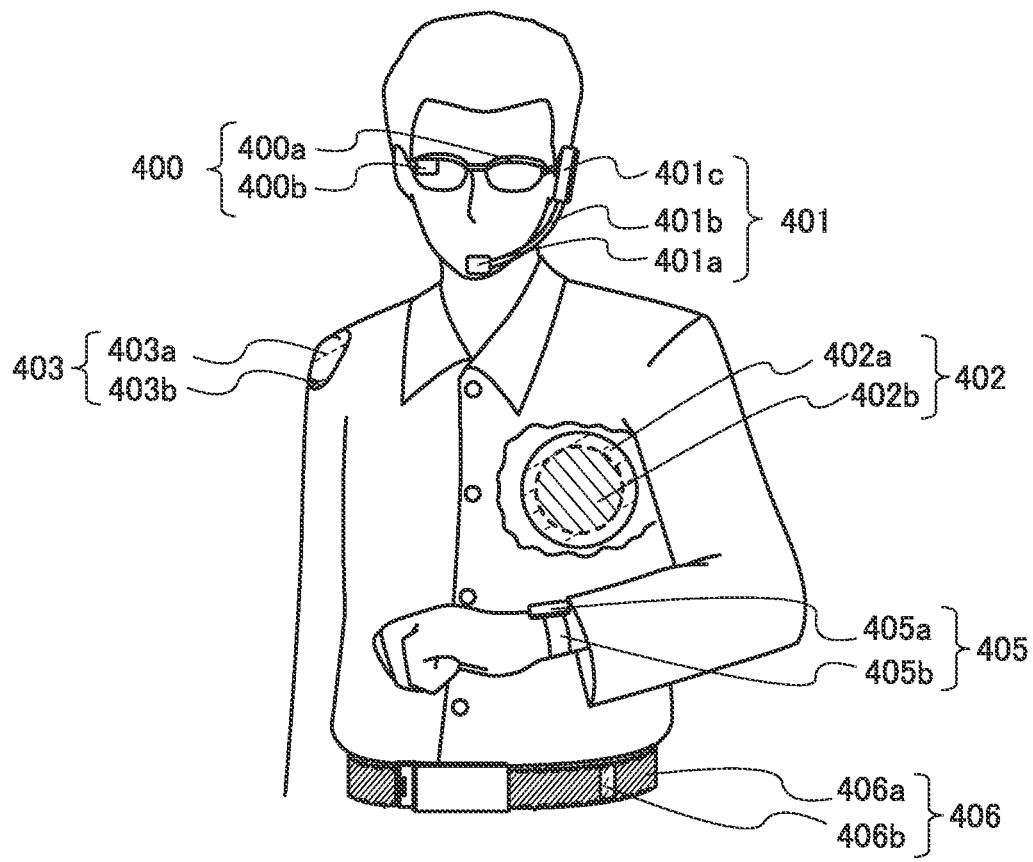
FIGS. 27A to 27C illustrate electronic devices of one embodiment of the present invention.
Figure 27B:
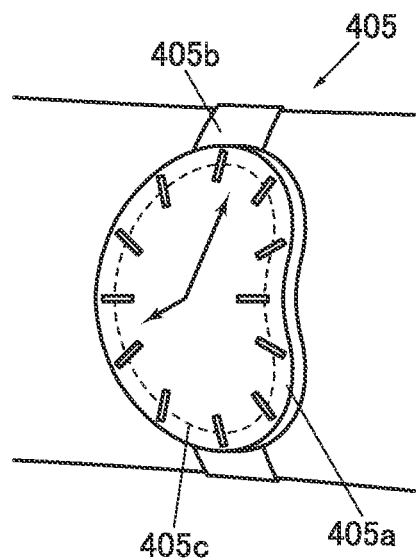
Figure 27C:
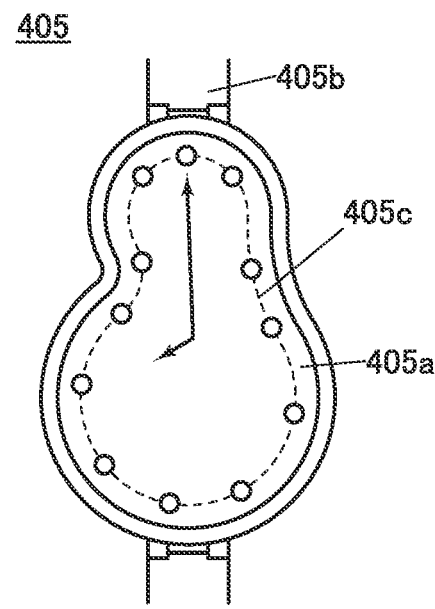

The power storage device described in Embodiment 1 can be provided in wearable devices illustrated in FIGS. 27A to 27C.

For example, the power storage device can be provided in a glasses-type device 400 illustrated in FIG. 27A. The glasses-type device 400 includes a frame 400a and a display portion 400b. The power storage device is provided in a temple of the frame 400a having a curved shape, whereby the glasses-type device 400 can have a well-balanced weight and can be used continuously for a long time.

The power storage device can also be provided in a headset-type device 401. The headset-type device 401 includes at least a microphone portion 401a, a flexible pipe 401b, and an earphone portion 401c. The power storage device can be provided in the flexible pipe 401b and the earphone portion 401c.

Furthermore, the power storage device can be provided in a device 402 that can be attached directly to a body. A power storage device 402b can be provided in a thin housing 402a of the device 402.

Furthermore, the power storage device can be provided in a device 403 that can be attached to clothes. A power storage device 403b can be provided in a thin housing 403a of the device 403.

Furthermore, the power storage device can be provided in a watch-type device 405. The watch-type device 405 includes a display portion 405a and a belt portion 405b, and the power storage device can be provided in the display portion 405a or the belt portion 405b.

FIG. 27B is an enlarged view of the watch-type device 405. In the watch-type device 405, a power storage device 405c is provided in the bent, round display portion 405a. For the display portion that can be used for the display portion 405a, the description of the display portion in FIG. 25 can be referred to. The display portion 405a can display various kinds of information such as time and reception information of an e-mail or an incoming call. The outer periphery of the display portion 405a of the watch-type device 405 may be a distorted closed curve as illustrated in FIG. 27C. The power storage device 405c can be provided along the display portion 405a.

Furthermore, the power storage device can be provided in a belt-type device 406. The belt-type device 406 includes a belt portion 406a and a wireless power feeding and receiving portion 406b, and the power storage device can be provided inside the belt portion 406a.

In addition, the watch-type device 405 is a wearable device that is wound around an arm directly; thus, a sensor that measures the pulse, the blood pressure, or the like of the user may be incorporated therein. Data on the exercise quantity and health of the user can be stored to be used for health maintenance.

Furthermore, devices that can be carried around, such as the above-described armband device 7300, cellular phone 7400, portable display device 7100, belt-type device 406, and watch-type device 405, may be provided with a positioning system such as the global positioning system (GPS). With the system, the user can find his/her present position, and the system is useful in dealing with kidnapping, wandering, and the like.

The watch-type device will be described in more detail with reference to FIGS. 28A to 29B.

Figure 28A:
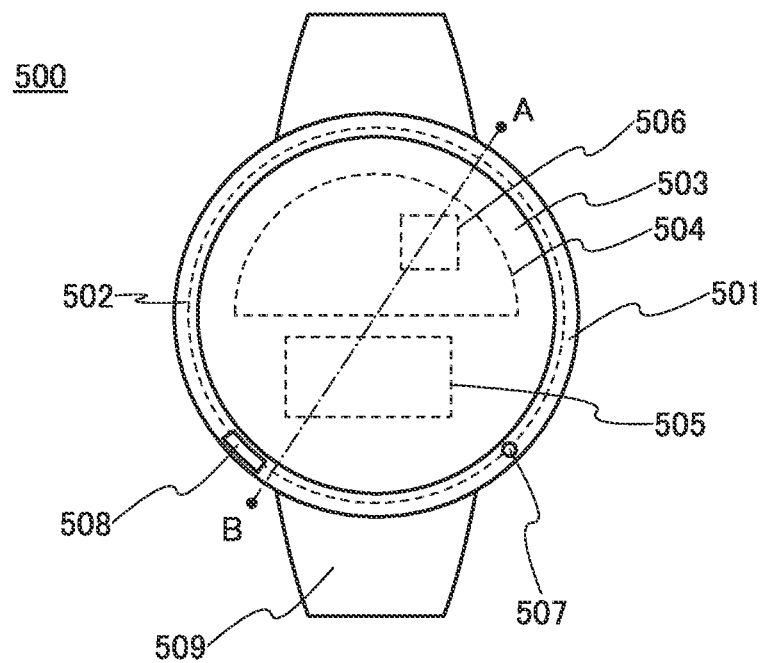
FIGS. 28A and 28B illustrate an electronic device of one embodiment of the present invention.
Figure 28B:
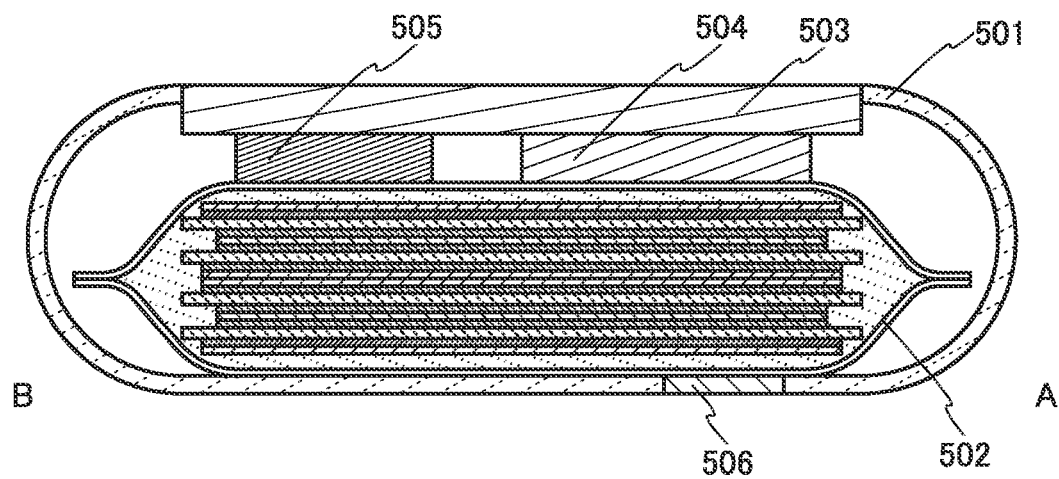

A watch-type device 500 illustrated in FIGS. 28A and 28B includes a housing 501, a power storage device 502, a display portion 503, a logic board 504, an antenna 505, a sensor 506, a microphone 507, a speaker 508, and a belt portion 509. FIG. 28A is a front view of the power storage device 502. FIG. 28B is a cross-sectional view of the watch-type device 500 along dashed-dotted line AB in FIG. 28A. When the housing 501, the display portion 503, and the logic board 504 have flexibility, the watch-type device can be curved along a user's arm.

Figure 29A:
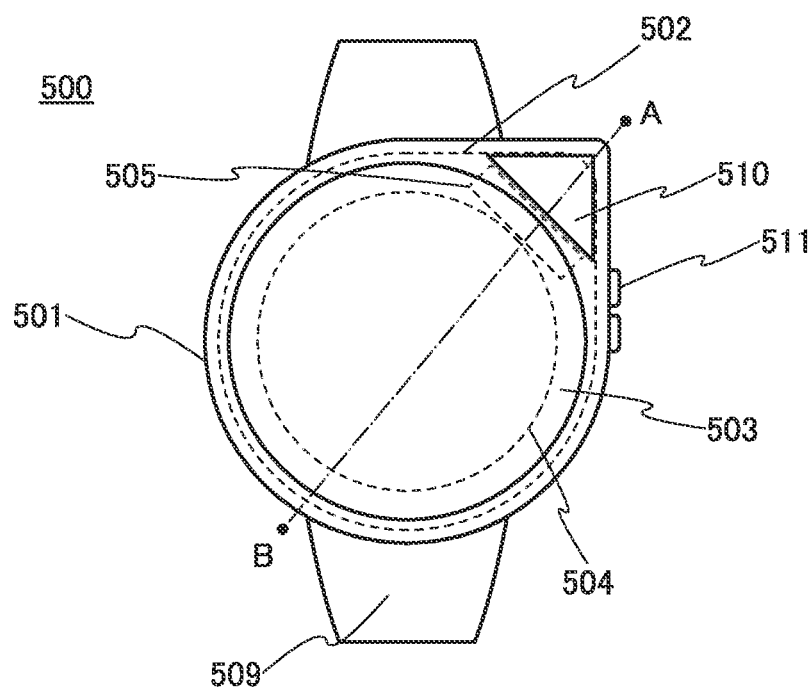
FIGS. 29A and 29B illustrate an electronic device of one embodiment of the present invention.
Figure 29B:
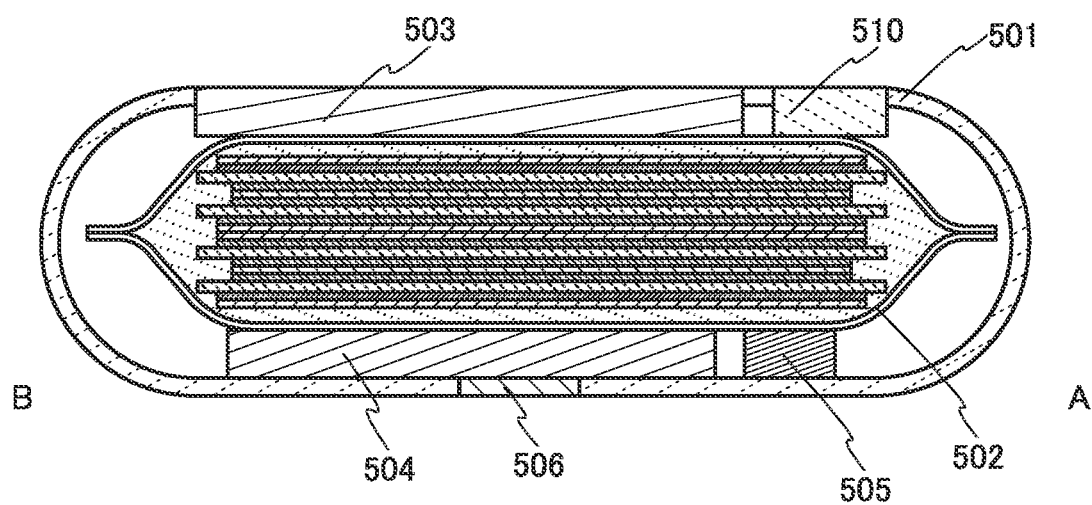

The watch-type device 500 illustrated in FIGS. 29A and 29B includes the housing 501, the power storage device 502, the display portion 503, the logic board 504, the antenna 505, the sensor 506, a solar battery 510, operation buttons 511, and the belt portion 509. FIG. 29A is a front view of the power storage device 502. FIG. 29B is a cross-sectional view of the watch-type device 500 along dashed-dotted line AB in FIG. 29A. The power storage device 502 can be charged by, for example, generating power in the solar battery 510.

Figure 30:
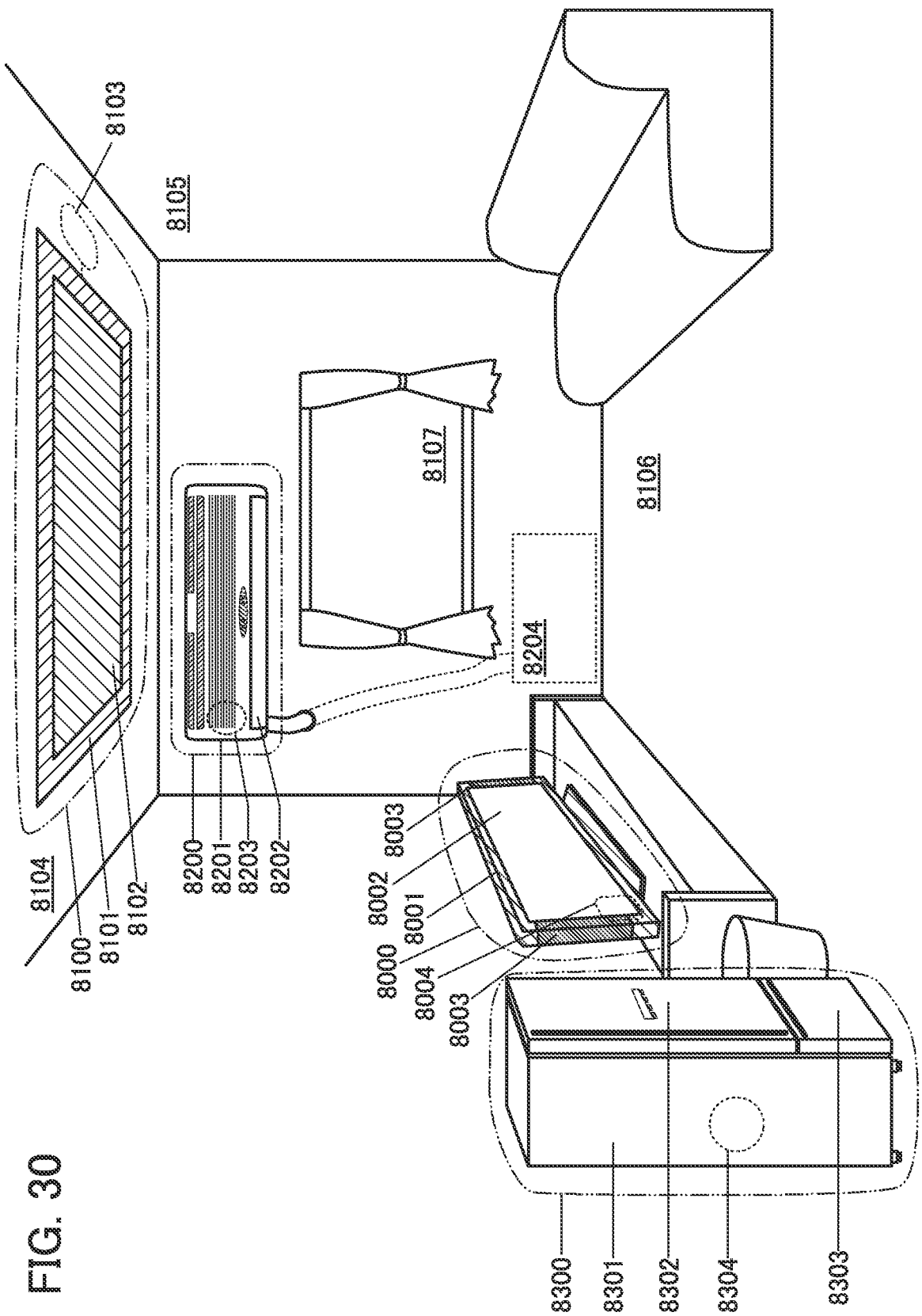
FIG. 30 illustrates electronic devices of one embodiment of the present invention.

FIG. 30 illustrates other examples of electronic devices. In FIG. 30, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 30, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 30 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 30 as an example, the power storage device of one embodiment of the present invention can be used in an installation lighting device provided in, for example, a wall 8105, a floor 8106, or a window 8107 other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 30, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 30 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 30 as an example, the power storage device of one embodiment of the present invention can be used in an air conditioner in which the functions of an indoor unit and an outdoor unit are integrated in one housing.

In FIG. 30, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, the power storage device 8304, and the like. The power storage device 8304 is provided in the housing 8301 in FIG. 30. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

This embodiment can be implemented in appropriate combination with any of the other embodiments.

Embodiment 5

Described in this embodiment are examples of vehicles including the power storage device shown in Embodiment 1.

The use of the power storage device in vehicles can lead to next-generation clean energy vehicles such as hybrid electric vehicles (HEVs), electric vehicles (EVs), and plug-in hybrid electric vehicles (PHEVs).

Figure 31A:
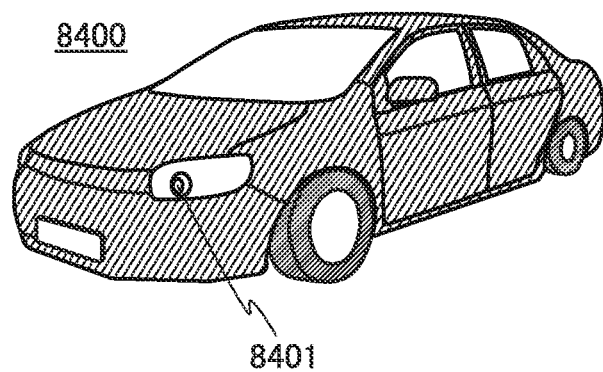
FIGS. 31A and 31B illustrate electronic devices of one embodiment of the present invention.
Figure 31B:
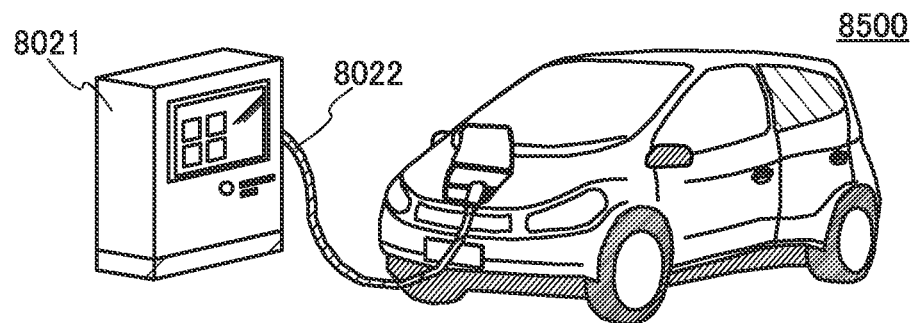

FIGS. 31A and 31B each illustrate an example of a vehicle using one embodiment of the present invention. An automobile 8400 illustrated in FIG. 31A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 31B illustrates an automobile 8500 including the power storage device. The automobile 8500 can be charged when the power storage device is supplied with electric power through external charging equipment by a plug-in system, a contactless power feeding system, or the like. In FIG. 31B, a power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8500 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar battery may be provided in the exterior of the automobile to charge the power storage device when the automobile stops or moves. To supply electric power in such a contactless manner, an electromagnetic induction method or a magnetic resonance method can be used.

Furthermore, the power storage device included in the vehicle can be used as a power source for supplying electric power to products other than the vehicle. In such a case, the use of a commercial power source can be avoided at peak time of electric power demand.

An example of a motorcycle using one embodiment of the present invention will be described with reference to FIGS. 32A and 32B.

Figure 32A:
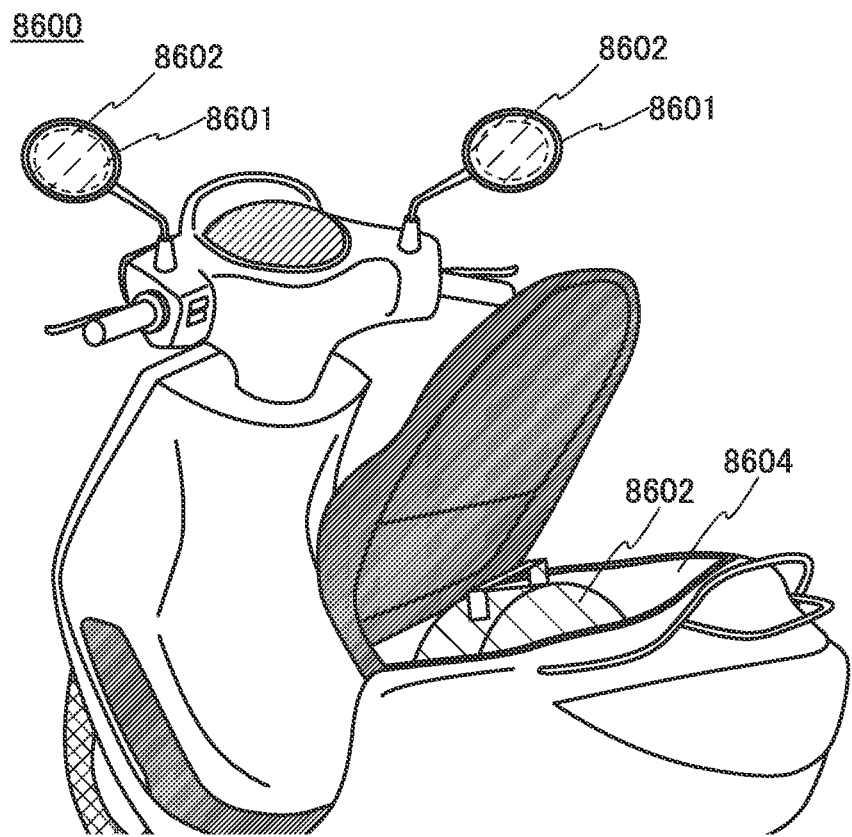
FIGS. 32A and 32B illustrate electronic devices of one embodiment of the present invention.
Figure 32B:
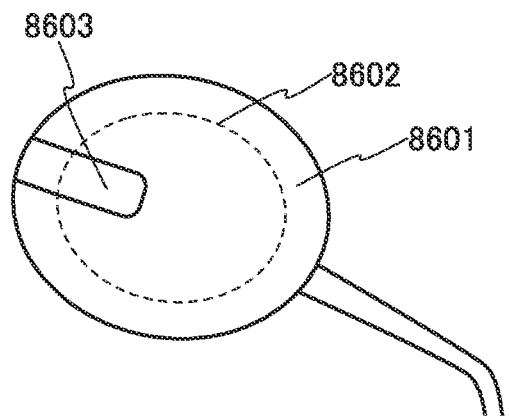

A motor scooter 8600 illustrated in FIG. 32A includes a power storage device 8602 in a side mirror 8601. The power storage device 8602 can be bent and therefore can be provided with high space efficiency in the side mirror 8601 even with a curved shape. FIG. 32B is an enlarged view of the side mirror 8601 seen from the front of the motor scooter 8600. The side mirror 8601 includes an indicator 8603. The power storage device 8602 can supply electric power to the indicator 8603.

Furthermore, in the motor scooter 8600 illustrated in FIG. 32A, the power storage device 8602 can be held in a storage unit under seat 8604. The power storage device 8602 can be bent and therefore can be held in the storage unit under seat 8604 even with a small size by being bent or folded.

This embodiment can be implemented in appropriate combination with any of the other embodiments.

This application is based on Japanese Patent Application serial No. 2015-088095 filed with Japan Patent Office on Apr. 23, 2015, the entire contents of which are hereby incorporated by reference.

What is claimed is:

1. A power storage device comprising:
an electrode; and
an exterior body,
wherein the electrode and the exterior body overlap with each other,
wherein an outer periphery of the exterior body comprises a first side, a second side, and a vertex,
wherein the vertex is a cross point of the first side and the second side,
wherein a distance between an outer periphery of the electrode and the vertex is larger than a distance between the outer periphery of the electrode and a part of the first side,
wherein the outer periphery of the electrode comprises a first region, and
wherein the first region has a shape protruding toward an inner side of the power storage device in a plan view.

2. The power storage device according to claim 1,
wherein the outer periphery of the exterior body comprises more than four vertexes in the plan view.

3. The power storage device according to claim 1,
wherein the power storage device has flexibility.

4. An electronic device comprising:
the power storage device according to claim 1; and
a housing having flexibility.

5. An electronic device comprising:
the power storage device according to claim 1;
a housing;
a display portion having flexibility;
a logic board; and
a belt portion,
wherein the display portion is bent and round.

6. The electronic device according to claim 5,
further comprising an antenna, a sensor, a microphone, and a speaker.

7. The electronic device according to claim 5,
wherein the electronic device is a watch-type device.

8. A power storage device comprising:
an electrode; and
an exterior body,
wherein the electrode and the exterior body overlap with each other,
wherein an outer periphery of the electrode comprises a first region, and
wherein the first region has a shape protruding toward an inner side of the power storage device in a plan view.

9. The power storage device according to claim 8,
wherein an outer periphery of the exterior body comprises a second region, and
wherein the second region is included in an area inside the first region in the plan view.

10. The power storage device according to claim 8,
wherein the outer periphery of the exterior body comprises more than four vertexes in the plan view.

11. The power storage device according to claim 8,
wherein the power storage device has flexibility.

12. An electronic device comprising:
the power storage device according to claim 8; and
a housing having flexibility.

13. An electronic device comprising:
the power storage device according to claim 8;
a housing;
a display portion having flexibility;
a logic board; and
a belt portion,
wherein the display portion is bent and round.

14. The electronic device according to claim 13, further comprising an antenna, a sensor, a microphone, and a speaker.

15. The electronic device according to claim 13, wherein the electronic device is a watch-type device.

* * * * *